(12) United States Patent
Shukla et al.

(10) Patent No.: US 9,819,614 B2
(45) Date of Patent: *Nov. 14, 2017

(54) METHODS AND APPARATUS FOR A DISTRIBUTED FIBRE CHANNEL CONTROL PLANE

(71) Applicant: Juniper Networks, Inc., Sunnyvale, CA (US)

(72) Inventors: Amit Shukla, Sunnyvale, CA (US); Suresh Boddapati, Union City, CA (US); Joseph White, San Jose, CA (US); Ravi Shekhar, Sunnyvale, CA (US); Jeevan Kamisetty, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/349,875

(22) Filed: Nov. 11, 2016

(65) Prior Publication Data

US 2017/0063729 A1 Mar. 2, 2017

Related U.S. Application Data

(63) Continuation of application No. 13/333,031, filed on Dec. 21, 2011, now Pat. No. 9,531,644.

(51) Int. Cl.
*H04L 12/931* (2013.01)
*H04L 29/12* (2006.01)
(Continued)

(52) U.S. Cl.
CPC ........ *H04L 49/357* (2013.01); *H04L 12/4675* (2013.01); *H04L 12/4679* (2013.01);
(Continued)

(58) Field of Classification Search
CPC ... H04L 49/357; H04L 49/30; H04L 12/4679; H04L 12/4675; H04L 49/351;
(Continued)

(56) References Cited

U.S. PATENT DOCUMENTS 5,138,615 A 8/1992 Lamport et al.
5,801,641 A 9/1998 Yang et al.
(Continued)

FOREIGN PATENT DOCUMENTS

CN 101848186 9/2010
EP 1 318 628 A1 6/2003
(Continued)

OTHER PUBLICATIONS

U.S. Appl. No. 12/345,498, filed Dec. 29, 2008, entitled "Control Plane Architecture for Switch Fabrics".
(Continued)

*Primary Examiner* — Walter Divito
(74) *Attorney, Agent, or Firm* — Cooley LLP

(57) ABSTRACT

In some embodiments, a system includes a set of network control entities associated with a distributed multi-stage switch. Each network control entity from the set of network control entities is configured to manage at least one edge device having a set of ports and coupled to the distributed multi-stage switch. Each network control entity from the set of network control entities is associated with a unique set of identifiers. A network control entity from the set of network control entities is configured to assign a unique identifier from its unique set of identifiers to a port from the set of ports of the at least one edge device in response to the network control entity receiving a login request associated with the port.

20 Claims, 6 Drawing Sheets

(51) Int. Cl.
  *H04L 12/46* (2006.01)
  *H04L 12/935* (2013.01)
  *H04L 29/06* (2006.01)

(52) U.S. Cl.
  CPC ............ *H04L 49/30* (2013.01); *H04L 49/351* (2013.01); *H04L 61/2038* (2013.01); *H04L 61/6022* (2013.01); *H04L 61/6045* (2013.01); *H04L 49/354* (2013.01); *H04L 65/102* (2013.01)

(58) Field of Classification Search
  CPC ............ H04L 61/2038; H04L 61/6045; H04L 61/6022; H04L 65/102; H04L 49/354
  See application file for complete search history.

(56) References Cited

U.S. PATENT DOCUMENTS

| | | |
|---|---|---|
| 5,825,772 A | 10/1998 | Dobbins et al. |
| 5,913,921 A | 6/1999 | Tosey et al. |
| 5,926,473 A | 7/1999 | Gridley |
| 5,987,028 A | 11/1999 | Yang et al. |
| 6,075,773 A | 6/2000 | Clark et al. |
| 6,212,183 B1 | 4/2001 | Wilford |
| 6,246,692 B1 | 6/2001 | Dai et al. |
| 6,385,198 B1 | 5/2002 | Ofek et al. |
| 6,393,026 B1 | 5/2002 | Irwin |
| 6,553,028 B1 | 4/2003 | Tang et al. |
| 6,609,153 B1 | 8/2003 | Salkewicz |
| 6,639,910 B1 | 10/2003 | Provencher et al. |
| 6,654,373 B1 | 11/2003 | Maher, III et al. |
| 6,658,481 B1 | 12/2003 | Basso et al. |
| 6,816,486 B1 | 11/2004 | Rogers |
| 6,823,454 B1 | 11/2004 | Hind et al. |
| 6,856,620 B1 | 2/2005 | Dunsmore et al. |
| 6,865,673 B1 | 3/2005 | Nessett et al. |
| 6,868,082 B1 | 3/2005 | Allen, Jr. et al. |
| 6,934,260 B1 | 8/2005 | Kanuri |
| 7,024,592 B1 | 4/2006 | Voas et al. |
| 7,173,931 B2 | 2/2007 | Chao et al. |
| 7,230,947 B1 | 6/2007 | Huber et al. |
| 7,233,568 B2 | 6/2007 | Goodman et al. |
| 7,245,629 B1 | 7/2007 | Yip et al. |
| 7,248,760 B1 | 7/2007 | Corbalis et al. |
| 7,277,429 B2 | 10/2007 | Norman et al. |
| 7,289,513 B1 | 10/2007 | Medved et al. |
| 7,315,897 B1 | 1/2008 | Hardee et al. |
| 7,330,467 B2 | 2/2008 | Sharma |
| 7,369,561 B2 | 5/2008 | Wybenga et al. |
| 7,406,038 B1 | 7/2008 | Oelke et al. |
| 7,408,927 B2 | 8/2008 | George |
| 7,415,034 B2 | 8/2008 | Muller et al. |
| 7,415,627 B1 | 8/2008 | Radhakrishnan et al. |
| 7,428,219 B2 | 9/2008 | Khosravi |
| 7,437,469 B2 | 10/2008 | Ellanti et al. |
| 7,466,703 B1 | 12/2008 | Arunachalam et al. |
| 7,471,676 B2 | 12/2008 | Wybenga et al. |
| 7,533,169 B1 | 5/2009 | Gold et al. |
| 7,596,614 B2 | 9/2009 | Saunderson et al. |
| 7,715,382 B2 | 5/2010 | Lakshman et al. |
| 7,746,799 B2 | 6/2010 | Kokot et al. |
| 7,792,993 B1 | 9/2010 | Hopprich et al. |
| 7,860,097 B1 | 12/2010 | Lovett et al. |
| 7,877,483 B1 | 1/2011 | Finn |
| 8,089,904 B2 | 1/2012 | Balasubramaniam et al. |
| 8,175,079 B2 | 5/2012 | Alapuranen et al. |
| 8,364,705 B1 | 1/2013 | Cooley et al. |
| 8,694,654 B1 | 4/2014 | Kalusivalingam et al. |
| 8,717,909 B1 | 5/2014 | Shekhar et al. |
| 8,798,045 B1 | 8/2014 | Aybay et al. |
| 8,806,031 B1 | 8/2014 | Kondur et al. |
| 8,918,631 B1 | 12/2014 | Kumar et al. |
| 8,958,420 B1 | 2/2015 | Shekhar et al. |
| 9,166,878 B1 | 10/2015 | Cook et al. |
| 9,391,796 B1 | 7/2016 | Shekhar et al. |
| 2002/0009078 A1 | 1/2002 | Wilson et al. |
| 2002/0051450 A1 | 5/2002 | Ganesh et al. |
| 2003/0039212 A1 | 2/2003 | Lloyd et al. |
| 2004/0023558 A1 | 2/2004 | Fowler et al. |
| 2004/0034702 A1 | 2/2004 | He |
| 2004/0039820 A1 | 2/2004 | Colby et al. |
| 2004/0054866 A1 | 3/2004 | Blumenau et al. |
| 2004/0064559 A1 | 4/2004 | Kupst et al. |
| 2004/0076151 A1 | 4/2004 | Fant et al. |
| 2004/0254909 A1 | 12/2004 | Testa |
| 2005/0129017 A1 | 6/2005 | Guingo et al. |
| 2005/0138346 A1 | 6/2005 | Cauthron |
| 2005/0180438 A1 | 8/2005 | Ko et al. |
| 2005/0193114 A1 | 9/2005 | Colby et al. |
| 2005/0232258 A1 | 10/2005 | Wybenga et al. |
| 2005/0267959 A1 | 12/2005 | Monga et al. |
| 2006/0005185 A1 | 1/2006 | Nguyen |
| 2006/0092975 A1 | 5/2006 | Ansari et al. |
| 2006/0164199 A1 | 7/2006 | Gilde et al. |
| 2006/0165085 A1 | 7/2006 | Konda |
| 2006/0198321 A1 | 9/2006 | Nadeau et al. |
| 2007/0036178 A1 | 2/2007 | Hares et al. |
| 2007/0073882 A1 | 3/2007 | Brown et al. |
| 2007/0115918 A1 | 5/2007 | Bodin et al. |
| 2007/0136489 A1 | 6/2007 | Temoshenko et al. |
| 2007/0153462 A1 | 7/2007 | Crippen et al. |
| 2007/0276833 A1 | 11/2007 | Sen et al. |
| 2007/0283045 A1 | 12/2007 | Nguyen et al. |
| 2008/0031151 A1 | 2/2008 | Williams |
| 2008/0086768 A1 | 4/2008 | Mirza-Baig |
| 2008/0089323 A1 | 4/2008 | Elias et al. |
| 2008/0112133 A1 | 5/2008 | Torudbakken et al. |
| 2008/0126788 A1 | 5/2008 | Kreek et al. |
| 2008/0130517 A1 | 6/2008 | Lee et al. |
| 2008/0151863 A1 | 6/2008 | Lawrence et al. |
| 2008/0165704 A1 | 7/2008 | Marchetti et al. |
| 2008/0186875 A1 | 8/2008 | Kitani |
| 2008/0192648 A1 | 8/2008 | Galles |
| 2008/0214059 A1 | 9/2008 | Rothermel et al. |
| 2008/0219184 A1 | 9/2008 | Fowler et al. |
| 2008/0320117 A1 | 12/2008 | Johnsen et al. |
| 2009/0037977 A1 | 2/2009 | Gai et al. |
| 2009/0049191 A1 | 2/2009 | Tolliver |
| 2009/0109963 A1 | 4/2009 | Tanizawa et al. |
| 2009/0154454 A1 | 6/2009 | Wittenschlaeger |
| 2009/0213779 A1 | 8/2009 | Zhang et al. |
| 2009/0219827 A1 | 9/2009 | Chen et al. |
| 2009/0219830 A1 | 9/2009 | Venner et al. |
| 2009/0271851 A1 | 10/2009 | Hoppe et al. |
| 2009/0304010 A1 | 12/2009 | Kurebayashi et al. |
| 2009/0328024 A1 | 12/2009 | Li et al. |
| 2010/0002382 A1 | 1/2010 | Aybay et al. |
| 2010/0002714 A1 | 1/2010 | George et al. |
| 2010/0040053 A1 | 2/2010 | Gottumukkula et al. |
| 2010/0091779 A1 | 4/2010 | Juhl et al. |
| 2010/0097926 A1 | 4/2010 | Huang et al. |
| 2010/0104280 A1 | 4/2010 | Carlson et al. |
| 2010/0165876 A1 | 7/2010 | Shukla et al. |
| 2010/0165877 A1 | 7/2010 | Shukla et al. |
| 2010/0169467 A1 | 7/2010 | Shukla et al. |
| 2010/0182933 A1 | 7/2010 | Hu et al. |
| 2010/0214949 A1 | 8/2010 | Smith et al. |
| 2010/0226281 A1 | 9/2010 | Ghosh et al. |
| 2010/0265832 A1 | 10/2010 | Bajpay et al. |
| 2010/0306408 A1 | 12/2010 | Greenberg et al. |
| 2011/0022693 A1 | 1/2011 | Cheethirala et al. |
| 2011/0069706 A1 | 3/2011 | Sen et al. |
| 2011/0161468 A1 | 6/2011 | Tuckey et al. |
| 2011/0228670 A1 | 9/2011 | Sasso et al. |
| 2011/0255533 A1 | 10/2011 | Gnanasekaran |
| 2011/0299539 A1 | 12/2011 | Ragagopal et al. |
| 2012/0033665 A1 | 2/2012 | Jacob Da Silva et al. |
| 2012/0069842 A1 | 3/2012 | Reddy et al. |
| 2012/0093154 A1 | 4/2012 | Rosenberg et al. |
| 2012/0128004 A1 | 5/2012 | Aybay et al. |
| 2012/0155320 A1 | 6/2012 | Vohra et al. |
| 2012/0155453 A1 | 6/2012 | Vohra |
| 2012/0158930 A1 | 6/2012 | Kalusivalingam et al. |
| 2012/0158942 A1 | 6/2012 | Kalusivalingam et al. |

(56) References Cited

U.S. PATENT DOCUMENTS

| | | | |
|---|---|---|---|
| 2012/0177370 A1 | 7/2012 | Berman | |
| 2012/0189009 A1 | 7/2012 | Shekhar et al. | |
| 2012/0308232 A1 | 12/2012 | Eisenhauer et al. | |
| 2013/0128746 A1 | 5/2013 | Yedavalli | |
| 2013/0163591 A1 | 6/2013 | Shukla et al. | |
| 2013/0163607 A1 | 6/2013 | Shukla et al. | |

FOREIGN PATENT DOCUMENTS

| | | |
|---|---|---|
| EP | 1 758 320 A1 | 2/2007 |
| EP | 1 892 905 A1 | 2/2008 |
| EP | 1 924 030 A1 | 5/2008 |
| EP | 2 164 209 A1 | 3/2010 |
| EP | 2 413 550 A1 | 7/2011 |
| EP | 2 369 782 A1 | 9/2011 |
| EP | 2 456 138 A1 | 5/2012 |
| EP | 2 466 825 A1 | 6/2012 |
| EP | 2 466 826 A1 | 6/2012 |
| GB | 2 362 289 A | 11/2001 |
| WO | WO 00/08801 | 2/2000 |
| WO | WO 2007/062163 A2 | 5/2007 |
| WO | WO 2008/144927 A1 | 12/2008 |

OTHER PUBLICATIONS

Office Action for U.S. Appl. No. 12/345,498, dated Apr. 28, 2010.
Final Office Action for U.S. Appl. No. 12/345,498, dated Oct. 26, 2010.
U.S. Appl. No. 12/415,504, filed Mar. 31, 2009, entitled "Methods and Apparatus for Dynamic Automated Configuration Within a Control Plane of a Switch Fabric".
Office Action for U.S. Appl. No. 12/415,504, dated Apr. 30, 2012.
Final Office Action for U.S. Appl. No. 12/415,504, dated Oct. 10, 2012.
Office Action for U.S. Appl. No. 13/053,801, dated Dec. 6, 2012.
Office Action for U.S. Appl. No. 12/969,233, dated Nov. 20, 2012.
U.S. Appl. No. 12/968,846, filed Dec. 15, 2010, entitled "Host Side Protocols for Use With Distributed Control Plane of a Switch".
Office Action for U.S. Appl. No. 12/968.846, dated Oct. 31, 2012.
U.S. Appl. No. 12/977,585, filed Dec. 23, 2010, entitled "Network Management Configuration for Retrieving and Aggregating Status Information From Resources Distributed Across a Network".
Office Action for U.S. Appl. No. 12/977,585, dated Sep. 13, 2012.
U.S. Appl. No. 12/968,769, filed Dec. 15, 2010 entitled "Systems and Methods for Automatically Detecting Network Elements".
Office Action dated Oct. 22, 2012 for U.S. Appl. No. 12/968,769, filed Dec. 15, 2010.
U.S. Appl. No. 12/976,075, filed Dec. 22, 2010 entitled Deriving Control Plane Connectivity During Provisioning of a Distributed Control Plane of a Switch.
Office Action dated Nov. 7, 2012 for U.S. Appl. No. 12/968,886, filed Dec. 10, 2010.
Office Action dated Jul. 30, 2012 for U.S. Appl. No. 12/968,957, filed Dec. 10, 2010.
Office Action dated Sep. 17, 2012 for U.S. Appl. No. 12/951,706, dated Sep. 17, 2012.
U.S. Appl. No. 13/435,919, filed Mar. 30, 2012, entitled "Methods and Apparatus for Virtualizing Switch Control Plane Engine".
Office Action dated Mar. 14, 2013 for U.S. Appl. No. 13/197,212, filed Aug. 3, 2011.
U.S. Appl. No. 13/342,277, filed Dec. 22, 2011, entitled "Methods and Apparatus for Using Border Gateway Protocol (BGP) for Converged Fibre Channel (FC) Control Plane".
U.S. Appl. No. 13/333,039, filed Dec. 21, 2011, entitled "Methods and Apparatus for a Distributed Fibre Channel Control Plane".
U.S. Appl. No. 13/197,212, filed Aug. 3, 2011, entitled "Methods and Apparatus for Route Installation Acknowledgement and Acknowledgement Aggregation in BGP".
Office Action dated Mar. 25, 2013 for U.S. Appl. No. 12/969,277, filed Dec. 15, 2010.
F.K. Liotopoulos et al., "A Modular, 160 Gbps ATM Switch Architecture for Multimedia Networking Support, based on a 3-Stage Clos Network" Proceedings of the International Teletraffic Congress. ITC-16. Teletraffic Engineering in a Competitive World. Edinburgh, UK, Jun. 7, 1999, Amsterdam: Elsevier, NL, vol. 3A, XP000877657 ISBN: 978-0-444-50268-1, pp. 529-538.
K. Kompella et al., "Virtual Private LAN Service (VPLS) Using BGP for Auto-Discovery and Signaling" [online], Retrieved from the Internet: <URL: http://www.ietf.org/rfc/rfc4761.txt>, Jan. 2007, 27 pages.
Cisco Systems, Inc., "Intermediate System-to-Intermediate System (IS-IS) TLVs" Document ID: 5739 [online], Retrieved from the Internet: <URL: http://www.cisco.com/en/US/tech/tk365/technologies_tech_note09186a0080094bbd.shtml>, Aug. 10, 2005, 8 pages.
Extended Search Report for European Application No. 11158837.2, dated Jun. 21, 2011.
Extended Search Report for European Application No. 11179603.3, dated Dec. 21, 2011.
Extended Search Report for European Application No. 11192571.5, dated Mar. 19, 2012.
Extended Search Report for European Application No. 11192565.7, dated Mar. 30, 2012.
Extended Search Report for European Application No. 11174003.1, dated Feb. 8, 2012.
Extended Search Report for European Application No. 11175433.9, dated Oct. 7, 2011.
European Search Report dated Mar. 27, 2013 for Application No. EP12190724.0, filed Oct. 31, 2012.
European Search Report dated Mar. 27, 2013 for Application No. EP12190757.0, filed Oct. 31, 2012.
Cisco Systems, "Cisco MDS 9000 Fabric Manager Switch Configuration Guide," Mar. 31, 2004, Cisco Systems, San Jose, CA, XP-002693429, 436 pgs.
Office Action for Chinese Patent Application No. 201210402713.1 dated Jan. 23, 2015.
Office Action for Chinese Patent Application No. 2012104027131 dated Oct. 13, 2015.
Office Action for European Patent Application No. 12190757.0, dated Aug. 8, 2014.
Office Action for European Patent Application 12190757.0, dated Jun. 2, 2015.
Extended European Search Report for Application No. EP15174945.4, dated Dec. 9, 2015.
Office Action for U.S. Appl. No. 13/333,031, dated Jul. 31, 2013.
Office Action for U.S. Appl. No. 13/333,031, dated Dec. 24, 2013.
Office Action for U.S. Appl. No. 13/333,031, dated Oct. 14, 2014.
Office Action for U.S. Appl. No. 13/333,031, dated May 1, 2015.
Office Action for U.S. Appl. No. 13/333,031 dated Sep. 24, 2015.
Office Action for U.S. Appl. No. 13/333,031 dated Mar. 24, 2016.
Office Action for Chinese Patent Application No. 201210401795.8 dated Jan. 28, 2015.
Office Action for U.S. Appl. No. 13/333,039 dated Jul. 31, 2013.
Office Action for U.S. Appl. No. 13/333,039 dated Jan. 16, 2014.
Office Action for U.S. Appl. No. 13/333,039 dated Aug. 22, 2014.
Office Action for U.S. Appl. No. 13/333,039 dated Jan. 28, 2015.
Office Action for U.S. Appl. No. 13/333,039 dated Jun. 26, 2015.
Office Action for U.S. Appl. No. 13/333,039 dated Dec. 21, 2015.
Office Action for European Search Report for Application No. EP15174945.4, dated Jul. 24, 2017.

METHODS AND APPARATUS FOR A DISTRIBUTED FIBRE CHANNEL CONTROL PLANE

CROSS-REFERENCE TO RELATED APPLICATIONS

This application is a Continuation application of, and claims priority to and the benefit of, U.S. patent application Ser. No. 13/333,031, filed Dec. 21, 2011 and entitled "METHODS AND APPARATUS FOR A DISTRIBUTED FIBRE CHANNEL CONTROL PLANE." The entire contents of the aforementioned application are herein expressly incorporated by reference in their entirety. This application is further related to co-pending U.S. patent application Ser. No. 13/333,039, filed Dec. 21, 2011 and entitled "Methods and Apparatus for a Distributed Fibre Channel Control Plane," which is incorporated herein by reference in its entirety.

BACKGROUND

Some embodiments described herein relate generally to Fibre Channel fabrics, and, in particular, to methods and apparatus for providing a distributed Fibre Channel control and forwarding plane for a Fibre Channel fabric.

Some known Fibre Channel fabrics implement a centralized control-plane design across multiple independent Fibre Channel switches without full distribution of software and services. Such a Fibre Channel fabric typically does not scale well because of the limits encountered with building large scale Fibre Channel fabrics from a large collection of independent Fibre Channel switches. Some other known Fibre Channel fabrics are built based on single large Fibre Channel switches. Such a Fibre Channel fabric, however, typically does not scale on switches, especially on large switches that host thousands of Fibre Channel ports. The limitations in scalability of those Fibre Channel fabrics can be caused by the limited size of conventional Fibre Channel switches. Furthermore, the limitations in scalability for the known Fibre Channel fabrics described above typically do not change with the Fibre Channel over Ethernet (FCoE) mechanism being applied, because those limitations are not transport dependent.

Accordingly, a need exists for a solution that can enable a Fibre Channel control plane to scale on a large distributed Fibre Channel switch and can be used for FCoE as well.

SUMMARY

In some embodiments, a system includes a set of network control entities associated with a distributed multi-stage switch. Each network control entity from the set of network control entities is configured to manage at least one edge device having a set of ports and coupled to the distributed multi-stage switch. Each network control entity from the set of network control entities is associated with a unique set of identifiers. A network control entity from the set of network control entities is configured to assign a unique identifier from its unique set of identifiers to a port from the set of ports of the at least one edge device in response to the network control entity receiving a login request associated with the port.

DETAILED DESCRIPTION

Figure 1:
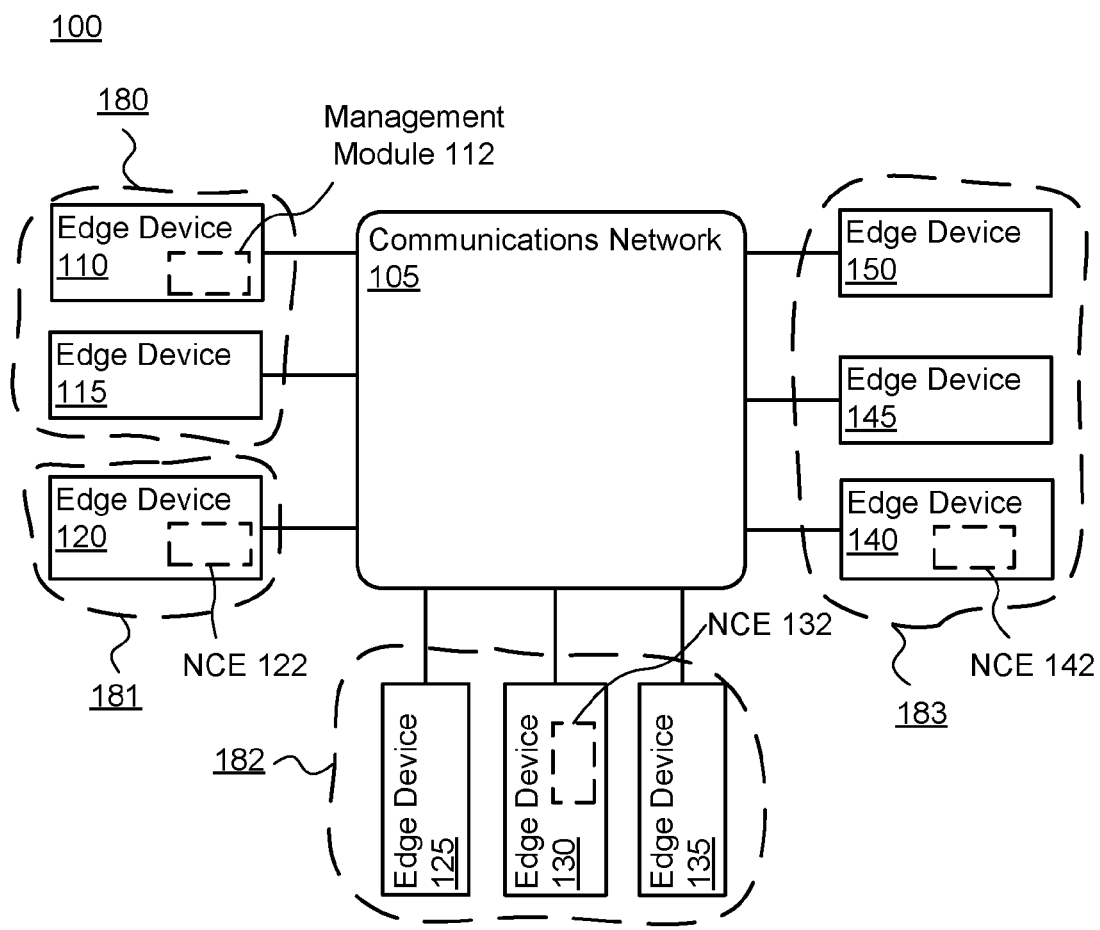
FIG. 1 is a schematic illustration of a switch fabric system, according to an embodiment.

In some embodiments, a switch fabric system can include a set of network control entities associated with a distributed multi-stage switch. Each network control entity from the set of network control entities can be configured to manage at least one edge device having a set of ports and coupled to the distributed multi-stage switch. In some embodiments, the at least one edge device can have a set of Fibre Channel F-ports. Each network control entity from the set of network control entities can be associated with a unique set of identifiers. In some embodiments, the switch fabric system can further include a management entity configured to assign a unique set of identifiers to each network control entity from the set of network control entities. The management entity can be configured to manage at least one edge device having a set of Fibre Channel E-ports.

In some embodiments, each network control entity from the set of network control entities can include a Fibre Channel Name Server Database storing information associated with the set of ports. In some embodiments, each network control entity from the set of network control entities can include an instance of a Fibre Channel Registered State Change Notification (RSCN) module. In some embodiments, each network control entity from the set of network control entities can be configured to receive and store an active Fibre Channel zone set. In some embodiments, each network control entity from the set of network control entities can include a Forwarding Information Base (FIB).

A first network control entity from the set of network control entities can be configured to assign a unique identifier from its unique set of identifiers to a port from the set of ports of the at least one edge device, in response to the first network control entity receiving a login request associated with the port. The first network control entity can be associated with a Fibre Channel Domain corresponding to a Fibre Channel Domain associated with a second network control entity. In some embodiments, the unique identifier can be a Fibre Channel Identifier (FCID) and the login request can be a Fabric Login (FLOGI) request. In some embodiments, the unique identifier can be a Fibre Channel over Ethernet (FCoE) Media Access Control (MAC) address and the login request can be included within a FCoE Initialization Protocol (FIP) packet.

In some embodiments, an apparatus can include a first network control entity associated with a distributed multi-stage switch. The first network control entity can be configured to receive, from a management module, a set of identifiers different from a set of identifiers assigned to a second network control entity by the management module. The first network control entity can be configured to associated with a Fibre Channel Domain corresponding to a Fibre Channel Domain associated with the second network control entity. The first network control entity can be configured to assign an identifier from its set of identifiers to a port in response to the first network control entity receiving a login request from the port. In some embodiments, the identifier can be a FCID and the login request can be a FLOGI request. In some other embodiments, the identifier can be a FCoE MAC address and the login request can be included in a FIP packet.

Furthermore, the first network control entity can be configured to receive, from the management module, an instance of an active zone set from a zone set database stored at the management module. Subsequently, the first network control entity can be configured to enforce the active zone set with respect to the port. In some embodiments, the active zone set can be an active Fibre Channel zone set. In some embodiments, the first network control entity can be configured to receive a state change registration (SCR) request from the port and configured to modify at least one of an N-port detected events list or a fabric-detected events list, in response to the SCR request.

As used herein, a module can be, for example, any assembly and/or set of operatively-coupled electrical components, and can include, for example, a memory, a processor, electrical traces, optical connectors, software (executing in hardware) and/or the like.

As used herein, the singular forms "a," "an" and "the" include plural referents unless the context clearly dictates otherwise. Thus, for example, the term "a switch fabric" is intended to mean a single switch fabric or a combination of switch fabrics.

As used herein, the term "physical hop" can include a physical link between two modules and/or devices. For example, a data path operatively coupling a first module with a second module can be said to be a physical hop. Similarly stated, a physical hop can physically link the first module with the second module.

As used herein, the term "single physical hop" can include a direct physical connection between two modules in a system. Similarly stated, a single physical hop can include a link via which two modules are coupled without intermediate modules. Accordingly, for example, if a first module is coupled to a second module via a single physical hop, the first module can send data packets directly to the second module without sending the data packets through intervening modules.

As used herein, the term "single logical hop" means a physical hop and/or group of physical hops that are a single hop within a network topology associated with a first protocol. Similarly stated, according to the topology associated with the first protocol, no intervening nodes exist between a first module and/or device operatively coupled to a second module and/or device via the physical hop and/or the group of physical hops. A first module and/or device connected to a second module and/or device via a single logical hop can send a data packet to the second module and/or device using a destination address associated with the first protocol and the second module and/or device, regardless of the number of physical hops between the first device and the second device. In some embodiments, for example, a second protocol can use the destination address of the first protocol to route a data packet and/or cell from the first module and/or device to the second module and/or device over the single logical hop. Similarly stated, when a first module and/or device sends data to a second module and/or device via a single logical hop of a first protocol, the first module and/or device treats the single logical hop as if it is sending the data directly to the second module and/or device.

FIG. 1 is a schematic illustration of a switch fabric system 100, according to an embodiment. The switch fabric system 100 includes a communications network 105; multiple edge devices 110, 115, 120, 125, 130, 135, 140, 145, and 150, some of which include network control entities (NCE) 122, 132, 142, or a management module 112. The communications network 105 can be any suitable communications network that operatively couples the edge devices 110-150 to the other edge devices 110-150. In some embodiments, the communications network 105 can include a multi-stage switch fabric. In some embodiments, the multi-stage switch fabric included in the communications network 105 can be a Fibre Channel fabric including multi-stage Fibre Channel switches. A Fibre Channel switch can be any network switch compatible with the Fibre Channel protocol (FCP).

Although shown in FIG. 1 as each edge device 110-150 being connected to the communications network 105 via, for example, a single line card, in other embodiments, each edge device 110-150 can be coupled to the communications network 105 using multiple line cards. For example, the edge device 110 can host two line cards, each of which is coupled to a different network entity within the communications network 105, respectively. Furthermore, although containing multiple network entities and devices, the switch fabric system 100 can be managed as a single virtual switch, and appear as a single virtual switch to the external network, such as peripheral processing devices or other networks connected to the edge device 110-150. For example, although the switch fabric system 100 can include multiple physical hops between two peripheral processing devices coupled to different edge devices 110-150, the switch fabric system 100 can be seen as a single logical hop between the two peripheral processing devices.

The switch fabric system 100 includes a data plane and a control plane. The data plane of the switch fabric system 100 includes a data plane portion of the communications network 105, which can facilitate transmission of data (e.g., data packets) between the edge devices 110-150. In some embodiments, the data plane portion of the communications network 105 can be a distributed switch fabric having multiple stages. For example, the data plane portion of the communications network 105 can be a Clos switch fabric network (e.g., a non-blocking Clos network, a strict sense non-blocking Clos network, a Benes network) having multiple stages of switching modules (e.g., integrated Ethernet switches). Such a distributed multi-stage switch fabric can include any number of stages. In some embodiments, for example, the distributed multi-stage switch fabric can include three, five, seven or nine stages. The data plane portion of the communications network 105 can be, for example, part of a core portion of a data center similar to the core portion of the data center described in co-pending U.S. patent application Ser. No. 12/495,337, filed Jun. 30, 2009, and entitled "Methods and Apparatus Related to Any-to-Any Connectivity Within a Data Center," which is incorporated herein by reference in its entirety.

In some embodiments, the data plane portion of the communications network 105 can be (e.g., can function as) a single consolidated Fibre Channel switch (e.g., a single large-scale consolidated L2/L3 Fibre Channel switch). In other words, the data plane portion of the communications network 105 can operate as a single logical entity (e.g., a single logical network element). Similarly stated, the data plane portion of the communications network 105 can be part of a single logical hop between a first edge device 110-150 and a second edge device 110-150 (e.g., along with the data paths between the edge devices 110-150 and the communications network 105). In some embodiments, the communications network 105 can communicate via fibre-channel interface devices (not shown in FIG. 1) operable to transmit data at a rate of, for example, 2 Gb/s, 4, Gb/s, 8 Gb/s, 10 Gb/s, 40 Gb/s, 100 Gb/s and/or faster link speeds.

The control plane of the switch fabric system 100 can include the network control entities 122, 132, 142, the management module 110, and a control plane portion of the communications network 105. The control plane portion of the communications network 105 can facilitate transmission of control signals (e.g., configuration information, route information, etc.) between network control entities 122, 132, 142 and the management module 112. For example, the management module 112 can be configured to send a unique set of identifiers to each of the network control entities 122, 132 and 142 via the control plane portion of the communications network 105. As a result, the network control entity 122, 132 or 142 can assign a unique identifier from its unique set of identifiers to a port at an edge device (e.g., edge device 120-150) managed by that network control entity in response to that network control entity receiving a login request associated with that port. Details of such an interaction between a management module and network control entities via, for example, a control plane portion of a communications network, are described with respect to FIGS. 3-6. Additionally, in some embodiments, the control plane portion of the communications network 105 can include direct links between the management module 112 and network control entities 122, 132, 142. In some other embodiments, the control plane portion of the communications network 105 can include intermediate modules and/or switches (not shown in FIG. 1) to operatively couple the management module 112 with network control entities 122, 132, 142.

Each edge device 110-150 can be any device configured to operatively couple, for example, one or more peripheral processing devices (e.g., compute devices, server devices, routing devices, storage devices, etc., not shown in FIG. 1) to the communications network 105. Although not shown in FIG. 1, each edge device 110-150 can have a set of ports, through which the edge device 110-150 can be coupled to one or more peripheral processing devices. In some embodiments, an edge device 110-150 can have converged enhanced Ethernet (CEE) and/or Fibre Channel interfaces providing FCoE and/or Fibre Channel connectivity to the peripheral processing devices (e.g., via its set of ports) coupled to that edge devices 110-150. In such embodiments, the network control entity 110-150 can function as a Fibre Channel forwarder (FCF) to the directly attached peripheral processing devices, and the communications network 105 can function as a Fibre Channel fabric including, for example, multi-stage Fibre Channel switches.

In some embodiments, the edge devices 110-150 can be, for example, access switches, input/output modules, top-of-rack devices and/or the like. Structurally, the edge devices 110-150 can function as both source edge devices and destination edge devices. Accordingly, the edge devices 110-150 can send data (e.g., a data stream of data packets and/or data cells) to and receive data from the communications network 105, and to and from the connected peripheral processing devices. In some embodiments, the edge device 110-150 can include a combination of hardware modules and software modules (stored and/or executing in hardware). In some embodiments, for example, each edge device 110-150 can include a field-programmable gate array (FPGA), an application specific integrated circuit (ASIC), a digital signal processor (DSP) and/or the like.

In some embodiments, each edge device 110-150 can be configured to communicate with the other edge devices 110-150 via the communications network 105 (e.g., within the data plane portion). Specifically, the data plane portion the communications network 105 can provide any-to-any connectivity between the edged devices 110-150. For example, the data plane portion of the communications network 105 can transmit (e.g., convey) data between the edge devices 110-150. In some embodiments, the communications network 105 can have at least hundreds or thousands of ports (e.g., egress ports and/or ingress ports) through which the edge devices 110-150 can transmit and/or receive data.

The edge devices 110-150 can include one or more network interface devices (e.g., a 40 Gigabit (Gb) Ethernet interface, a 100 Gb Ethernet interface, etc.) through which the edge devices 110-150 can send signals to and/or receive signals from the communications network 105. The signals can be sent to and/or received from the communications network 105 via, for example, a Fibre Channel link, an electrical link, an optical link, and/or a wireless link operatively coupled to the edge devices 110-150. In some embodiments, the edge devices 110-150 can be configured to send signals to and/or receive signals from the communications network 105 based on one or more protocols (e.g., an Ethernet protocol, a multi-protocol label switching (MPLS) protocol, a Fibre Channel protocol, a FCoE protocol, an Infiniband-related protocol, a cell-based protocol, etc.).

As shown in FIG. 1, the edge device 120, 130, 140 can host network control entity 122, 132, 142, respectively. Each network control entity 122, 132, 142 can be a process, application, virtual machine, and/or some other software module (executing in hardware) or a hardware module executed at the edge device 120, 130, 140, respectively. As such, instructions that implement network control entity 122, 132, 142 can be for example stored within a memory of the edge device 120, 130, 140 and executed at a processor of the edge device 120, 130, 140.

In some embodiments, network control entities 122, 132, 142 can be part of a control plane of the switch fabric system 100. In such embodiments, each network control entity 122, 132, 142 can be configured to manage one or more than one edge devices. For example, as shown in FIG. 1, the network control entity 122 can be operable to manage the edge device 120 associated with the group of edge devices 181; the network control entity 132 can be operable to manage the edge devices 125, 130, 135 associated with the group of edge devices 182; and the network control entity 142 can be configured to manage the edge devices 140, 145, 150 associated with the group of edge devices 183.

In some embodiments, each network control entity 122, 132, 142 can be configured to manage one or multiple ports (not shown in FIG. 1) of the edge device(s) managed by that network control entity. In some embodiments, such a port of an edge device managed by the network control entity 122, 132, 142 can be a Fibre Channel F-port. A Fibre Channel F-port is a port on a Fibre Channel switching device (e.g., an edge device) that is used to connect to a node device (e.g., a host device, a server device, a storage device, a peripheral processing device, etc.) point-to-point. Similarly stated, a Fibre Channel F-port of a Fibre Channel switching device can be connected to a port on a node device (also referred to as an N-port, or a node port) using the Fibre Channel Point-to-Point (FC-P2P) topology or the Fibre Channel switched fabric (FC-SW) topology. For example, the network control entity 122 can be operable to manage a Fibre Channel F-port of the edge device 120 that is connected to an N-port of a peripheral processing device (not shown in FIG. 1, e.g., a server, a desktop computer, a mobile phone, etc.). In some embodiments, a Fibre Channel F-port is also referred to as a Fibre Channel Fabric port.

In some embodiments, each network control entity 122, 132, 142 can manage and/or maintain configuration information (e.g., port protocol information, network segment assignment information, port assignment information, peripheral processing device information, etc.) and/or forwarding-state information (e.g., port identifiers, network segment identifiers, peripheral processing device identifiers, etc.) associated with its group of edge devices 181, 182, 183. Each network control entity 122, 132, 142 can monitor a state and/or status of edge devices (e.g., edge devices 120-150) associated with its group of edge devices 181, 182, 183, and/or manage and maintain other information associated with the edge devices and/or ports associated with its group of edge devices 181, 182, 183, respectively.

In some embodiments, a network control entity can control and/or manage an edge device at which the network control entity is located (e.g., the network control entity 122 manages the edge device 120). In some other embodiments, a network control entity can also control and/or manage one or more edge devices other than the edge device at which the network control entity is located (e.g., network control entity 132 manages the edge device 125, 135). In some embodiments, a management module (e.g., the management module 112) within the switch fabric system 100 has flexibility to assign an edge device of the switch fabric system 100 to a network control entity 122, 132, 142 based on, for example, processing capacity. Additionally, in such embodiments, the management module is not constrained by the physical location of network control entities 122, 132, 142 and/or the edge devices when assigning the edge devices to a network control entity 122, 132, 142.

In some embodiments, management modules, processes and/or functions associated with the switch fabric system 100 can be hosted at one or more edge devices. As shown in FIG. 1, the edge device 110 can host a management module 112. Similar to the network control entity 122, 132, 142, the management module 112 can be part of the control plane of the switch fabric system 100. In some other embodiments, a management module similar to the management module 112 can be hosted at another type of device within the switch fabric system 100, such as a computer device, a server device, or the like.

In some embodiments, the management module 112 can be a process, application, virtual machine, and/or some other software module (executing in hardware) or a hardware module executed at the edge device 110. In some embodiments, for example, instructions that implement the management module 112 can be stored at a memory within the edge device 110 and executed at a processor of the edge device 110.

In some embodiments, the management module 112 can divide and/or partition the edge devices 110-150 into the groups of edge devices 180-183 to be managed by network control entities 122, 132, 142, and the management module 112. As such, the management module 112 can associate the group of edge devices 181 with the network control 122, the group of edge devices 182 with the network control entity 132, and the group of edge devices 183 with the network control entity 142. Furthermore, the management module 112 can itself manage the edge device 110, 115 associated with the group of edge devices 180. Additionally, the management module 112 can also monitor an available processing capacity of each network control entity 122, 132, 142, and initiate and/or terminate network control entities 122, 132, 142 when the available processing capacity of a network control entity 122, 132, 142 crosses (e.g., falls below) a first threshold and/or crosses (e.g., exceeds) a second threshold. In other embodiments, the management module does not perform the function of grouping edge devices to be managed by different network control entities and/or management modules. In such embodiments, this functionality can be hosted within another device (not shown in FIG. 1, e.g., a centralized device within the communications network 105) in the switch fabric system 100.

In some embodiments, the management module 112 can store (e.g., in a memory) a configuration file associated with configuration information (e.g., port protocol information, network segment assignment information, port assignment information, peripheral processing device information, etc.) and/or forwarding-state information (e.g., routing information, port identifiers, network segment identifiers, peripheral processing device identifiers, etc.) for the switch fabric system 100. In some embodiments, the management module 112 can send a portion of the forwarding-state information associated with a respective group of edge devices 180-183 to the related network control entities 122, 132, 142 via the control plane portion of the communications network 105. Alternatively, in some other embodiments, the configuration information, forwarding-state information and/or other information (e.g., a name server database) associated with the switch fabric system 100 can be stored at a device and/or module different than the management module 112. The stored information can then be distributed from that device and/or module to the relevant network control entities (e.g., network control entity 122, 132, 142) and/or management modules (e.g., management module 112) using, for example, a scalable state distribution mechanism embedded in the switch fabric system 100. In still other embodiments, the switch fabric system 100 can include multiple management modules. For example, each management module from the multiple management modules can be configured to distribute a different portion of the forwarding-state information to the relevant network control entities and/or management modules.

Similar to the network control entities 122, 132, 142, the management module 112 can be operable to manage one or multiple ports (not shown in FIG. 1) of the edge device 110, 115, which are associated with the group of edge devices 180 managed by the management module 112. In some embodiments, such an edge device managed by the management module 112 can include at least a Fibre Channel F-Port and a Fibre Channel E-port. Different from a Fibre Channel F-port, a Fibre Channel E-port is a port on a Fibre Channel switching device (e.g., an edge device) that is used to connect to another Fibre Channel switching device. For example, the management module 112 can be operable to manage a Fibre Channel F-port and a Fibre Channel E-port of the edge device 110. The Fibre Channel F-port managed by the management module 112 can be connected to, for example, an N-port of a node device (not shown in FIG. 1); and the Fibre Channel E-port managed by the management module 112 can be connected to, for example, another Fibre Channel E-port of another edge device (not shown in FIG. 1) of another switch fabric. Thus, the switch fabric system 100 can be expanded by connecting to other Fibre Channel switching device(s) (e.g., of another switch fabric) via the Fibre Channel E-port(s) of the edge device 110, 115. In some embodiments, such a Fibre Channel E-port can be referred to as an expansion port. In some embodiments, a link between Fibre Channel E-ports of two Fibre Channel switching devices can be referred to as an inter-switch link (ISL). More details of a management module and a network control entity are described with respect to FIGS. 3-6.

Figure 2:
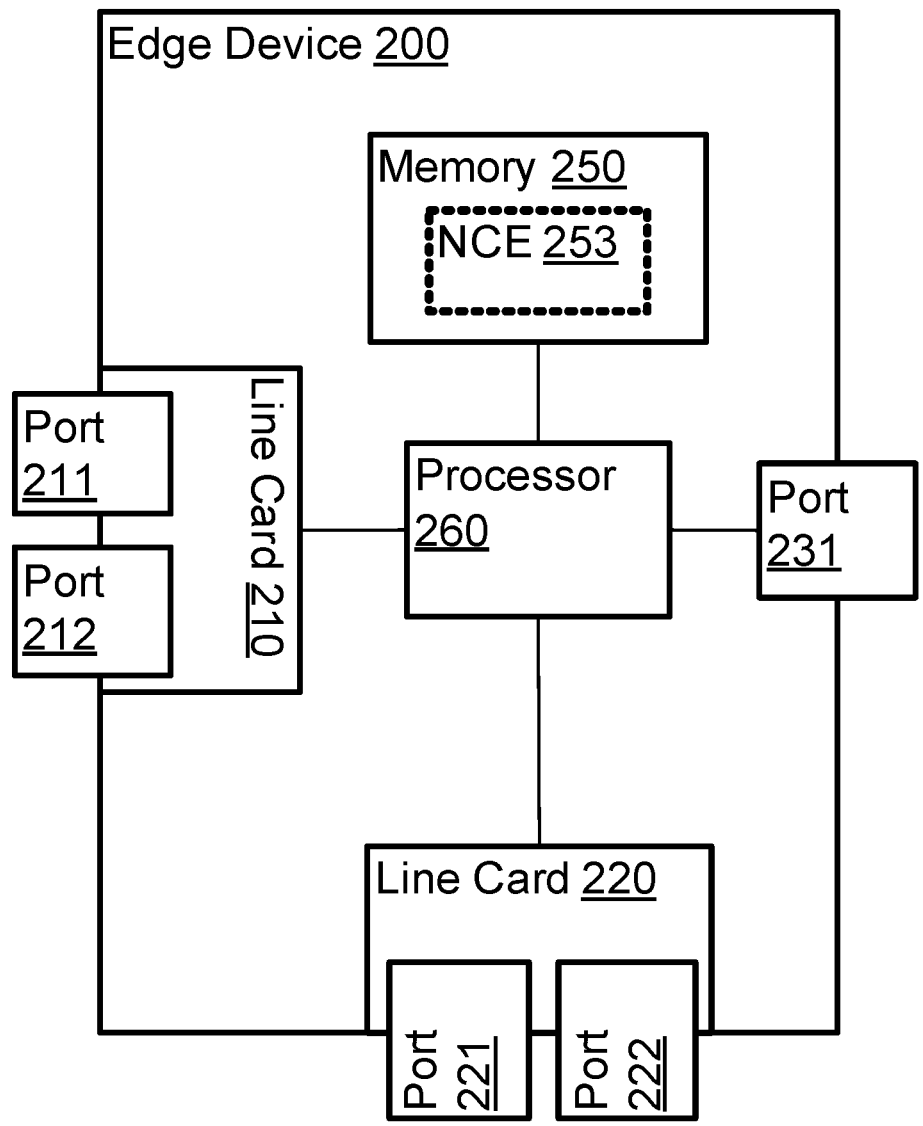
FIG. 2 is a system block diagram of an edge device that includes a network control entity, according to an embodiment.

FIG. 2 is a system block diagram of an edge device 200 that includes a network control entity 253, according to an embodiment. The edge device 200 can be structurally and functionally similar to the edge device 120-150 shown and described with respect to FIG. 1. As shown in FIG. 2, the edge device 200 includes a processor 260; a memory 250, which includes the network control entity 253; line cards 210, 220; and a port 231. The processor 260 is operatively coupled to the memory 250, line card 210, line card 220 and port 231. The line card 210 includes ports 211 and 212. The line card 220 includes ports 221 and 222. In some embodiments, line cards 210 and/or 220 can include one or more processors and/or memories. In some embodiments, a port can be any entity that can actively communicate with a coupled device or over a network. The port need not necessarily be a hardware port, but can be a virtual port or a port defined by software.

In some embodiments, ports 211, 212, 221 and 222 can communicate with, for example, peripheral processing devices coupled to the edge device 200. For example, ports 211, 212, 221 and 222 can implement a physical layer using fiber-optic signaling via fiber-optic cables. In some embodiments, some of ports 211, 212, 221 and 222 can implement one physical layer such as fiber-optic signaling and others of ports 211, 212, 221 and 222 can implement a different physical layer such as twisted-pair electrical signaling. Furthermore, ports 211, 212, 221 and 222 can allow the edge device 200 to communicate with peripheral processing devices, such as, for example, computer servers, via a common protocol such as Fibre Channel or Ethernet. In some embodiments, some of ports 211, 212, 221 and 222 can implement one protocol such as Fibre Channel and others of ports 211, 212, 221 and 222 can implement a different protocol such as Ethernet. Thus, the edge device 200 can be in communication with multiple peripheral processing devices using homogeneous or heterogeneous physical layers and/or protocols via ports 211, 212, 221 and 222. In some embodiments, the port 211, 212, 221 or 222 can be a Fibre Channel F-port that can be potentially coupled to, for example, a N-port of a node device. In such embodiments, the management module 253 can be configured to manage at least a Fibre Channel F-port (e.g., port 211, 212, 221, 222).

In some embodiments, the port 231 can be connected to a device (e.g., a switching device, a routing device) within a communications network (e.g., the communications network 105 in FIG. 1), such that the edge device 200 can be operatively coupled to other devices via the communications network. The port 231 can be part of one or more network interfaces (e.g., a 40 Gigabit (Gb) Ethernet interface, a 100 Gb Ethernet interface, etc.) through which the edge device 200 can send signals to and/or receive signals from the communications network. The signals can be sent to and/or received from the communications network via an optical link, an electrical link and/or a wireless link operatively coupled to the edge device 200. In some embodiments, the edge device 200 can send signals to and/or receive signals from the communications network based on one or more protocols (e.g., a Fibre Channel protocol, a Fibre-Channel-over Ethernet (FCoE) protocol, an Ethernet protocol, a multi-protocol label switching (MPLS) protocol, an Infini-band-related protocol). In some embodiments, the port 231 can be a Fibre Channel E-port that can be potentially coupled to, for example, an Fibre Channel E-port of another Fibre Channel switching device (e.g., another edge device, a switching device in a communications network, etc.). In such embodiments, the management module 253 can be configured to manage at least a Fibre Channel E-port (e.g., port 231).

In some embodiments, the port 231 can implement a different physical layer and/or protocol than those implemented at ports 211, 212, 221 and 222. For example, the port 211, 212, 221 and 222 can communicate with peripheral processing devices using a protocol based on data packets and the port 231 can communicate via a switch fabric (e.g., the switch fabric system 100 in FIG. 1) using a protocol based on data cells. Said differently, the edge device 200 can be an edge device of a network switch such as a distributed network switch.

In some embodiments, the memory 250 can be, for example, a random-access memory (RAM) (e.g., a dynamic RAM, a static RAM), a flash memory, a removable memory, and/or so forth. In some embodiments, instructions that implement the network control entity 253 can be stored within the memory 250 and executed at the processor 260. Similar to network control entities 122, 132, 142 in FIG. 1, the network control entity 253 can be, for example, a process, application, virtual machine, and/or some other software module (executing in hardware) or a hardware module configured to manage one or more edge devices (e.g., the edge device 200) and ports (e.g., port 211, 212, 221, 222, 231) of the edge device 200 and/or other devices. For example, the network control entity 253 can manage and/or maintain configuration information (e.g., port protocol information, network segment assignment information, port assignment information, peripheral processing device information, etc.) and/or forwarding-state information (e.g., port identifiers, network segment identifiers, peripheral processing device identifiers, etc.) associated with a group of edge devices and their associated ports. The network control entity 253 can also, for example, monitor a state and/or status of peripheral processing devices associated with the group of edge devices, and/or manage and maintain other information associated with the peripheral processing devices and/or ports associated with the group of edge devices.

In some embodiments, the network control entity 253 can be implemented as, within the memory 250, a non-transitory processor-readable medium that stores code representing instructions to be executed by the processor 260. Particularly, some of the instructions can be executed such that the network control entity 253 of the edge device 200, among other operations, retrieves and distributes identifiers for login request. Details of such operations are further described with respect to FIGS. 5-6.

Figure 3:
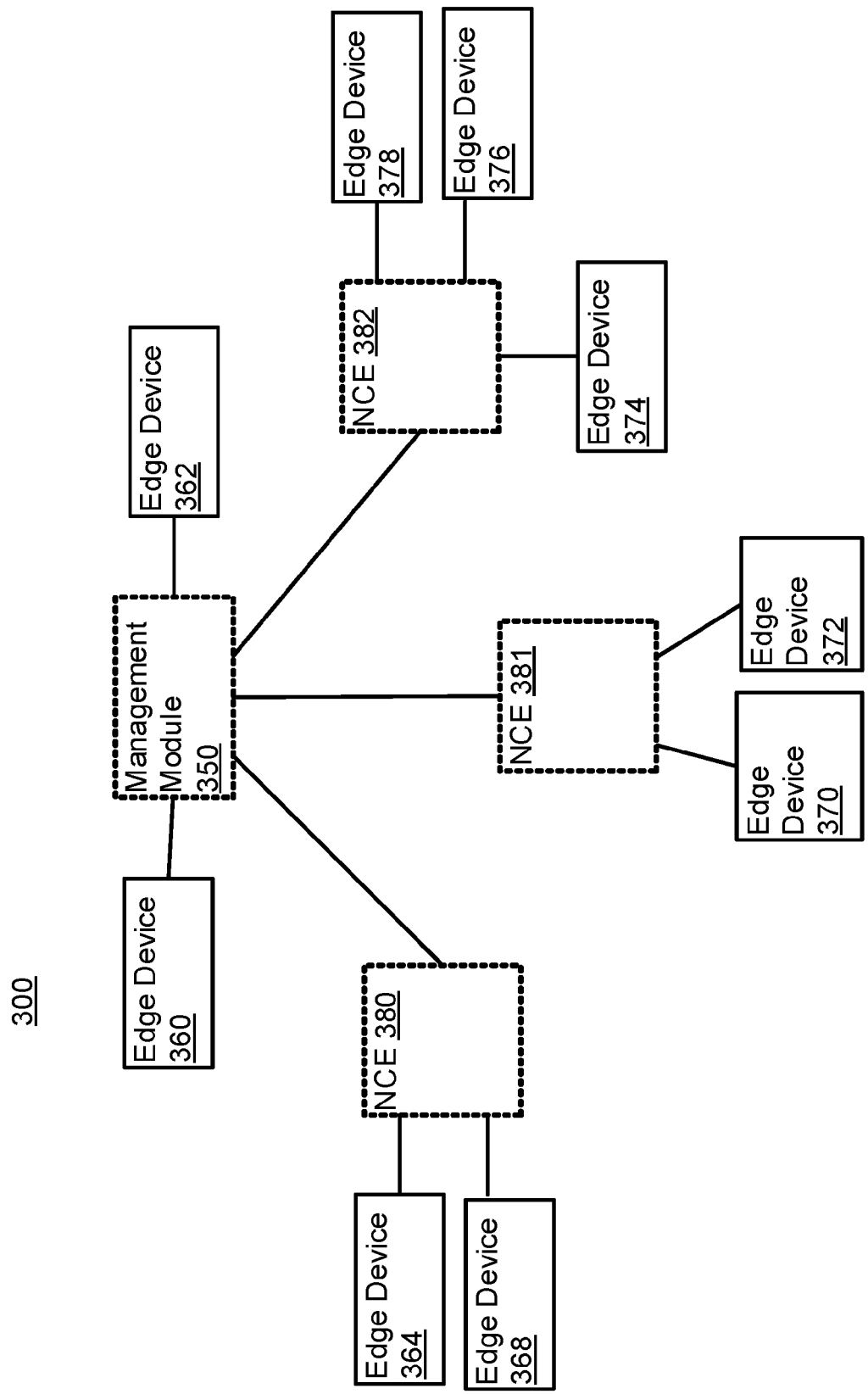
FIG. 3 is a schematic illustration of a management module configured to be operatively coupled to and manage multiple network control entities, according to an embodiment.

FIG. 3 is a schematic illustration of a management module 350 configured to be operatively coupled to and manage multiple network control entities 380, 381, 382, according to an embodiment. As shown in FIG. 3, network control entities 380-382 are operatively coupled to the management module 350, and such a connection can be through a control plane portion of a communications network (not shown in FIG. 3, e.g., the communications network 105 in FIG. 1). Furthermore, the management module 350, the network control entities 380-382 and the control plane portion of the communications network coupling the management module 350 and the network control entities 380-382 are within a control plane of a switch fabric system 300. Additionally, the network control entities 380-382 can be structurally and functionally similar to the network control entities 122, 132, 142 shown and described with respect to FIG. 1, and the management module 350 can be structurally and functionally similar to the management module 112 shown and described with respect to FIG. 1.

Similar to the network control entities and the management module in FIG. 1, each network control entity 380-382 and the management module 350 can be configured to manage one or multiple edge devices. Specifically, as shown in FIG. 3, the network control entity 380 can be configured to manage edge devices 364, 368; the network control entity 381 can be configured to manage edge devices 370, 372; the network control entity 382 can be configured to manage edge devices 374, 376, 378; and the management module 350 can be configured to manage edge devices 360, 362. In some embodiments, a network control entity or a management module can be configured to manage an edge device hosting that network control entity or that management module, or an edge device operatively coupled to the edge device hosting that network control entity or that management module (e.g., via a communications network). For example, the edge device 364 can be the edge device within which the network control entity 380 is hosted, and the edge device 368 can be an edge device operatively coupled to and managed by the network control entity 380.

As shown in FIG. 3, the management module 350 can provide a single point of connectivity of a physical switch spans across multiple network control entities 380-382. Furthermore, in some embodiments, the management module 350 can provide a single point of connectivity between the switch fabric system 300 and another switch fabric system and/or switch (not shown in FIG. 3). In such embodiments, the switch fabric system 300 shown in FIG. 3 can appear as a single virtual switch to other switch fabric systems and/or switches operatively coupled to the switch fabric system 300 via the management module 350. Additionally, communication between the switch fabric system 300 and another switch fabric system and/or switch can be controlled by the management module 350.

As described with respect to FIG. 1, a management module (e.g., the management module 350) can manage at least one edge device (e.g., the edge device 360, 362) having a set of Fibre Channel E-ports and/or a set of Fibre Channel F-ports. In some embodiments, such an edge device can include a group of one or more top-of-rack (TOR) or other type of Fibre Optical connectors with CEE (converged enhanced Ethernet) or Fibre Channel interface providing connectivity to external Fibre Channel switching devices (e.g., edge devices). In some embodiments, such an edge device managed by a management module can provide both Fibre Channel E-ports and F-ports. Thus, such an edge device can provide connectivity to both a Fibre Channel switching device (e.g., another edge device, a switch fabric) via a Fibre Channel E-port and a node device (e.g., a host device, a server device, a storage device) via a Fibre Channel F-port. Similarly, a network control entity (e.g., the network control entity 380-382) can manage at least one edge device (e.g., the edge device 364, 368, 370, 372, 374, 376, 378) having a set of Fibre Channel F-ports. In some embodiments, such an edge device managed by a network control entity provides Fibre Channel F-ports but not any Fibre Channel E-port.

In the control plane of a switch fabric system 300, various Fibre Channel services and/or protocols can be distributed across the network control entities 380-382 and the management module 350 to enable the overall Fibre Channel control plane to scale, such that a large number of Fibre Channel F-ports and/or E-ports associated with the edge devices within the switch fabric system can be supported. Such Fibre Channel services and/or protocols can include, for example, a Fabric Login (FLOGI) server, a name server, a zone server, FIP, a domain manager, etc. Specifically, a set of Fibre Channel services and protocols (e.g., a FLOGI server, a name server, a zone server, a RSCN server, FIP, etc.) can be supported on a Fibre Channel F-port, and a set of Fibre Channel services and protocols (e.g., a E-port state machine, a domain manager, a distributed FLOGI server coordinator (DFSC), FIP, Fibre shortest path first (FSPF) protocol, etc.) can be supported on a Fibre Channel E-port. In some embodiments, as described in further details with respect to FIG. 4, the services and protocols supported at a Fibre Channel F-port may be different from the services and protocols supported at a Fibre Channel E-port. In some embodiments, some of the Fibre Channel services and/or protocols for the switch fabric system 300 can be run at and managed by the management module 350, in a centralized fashion. Such centralized Fibre Channel services and/or protocols can include, for example, the domain manager, the FSPF protocol, E-port support service, etc.

Figure 4:
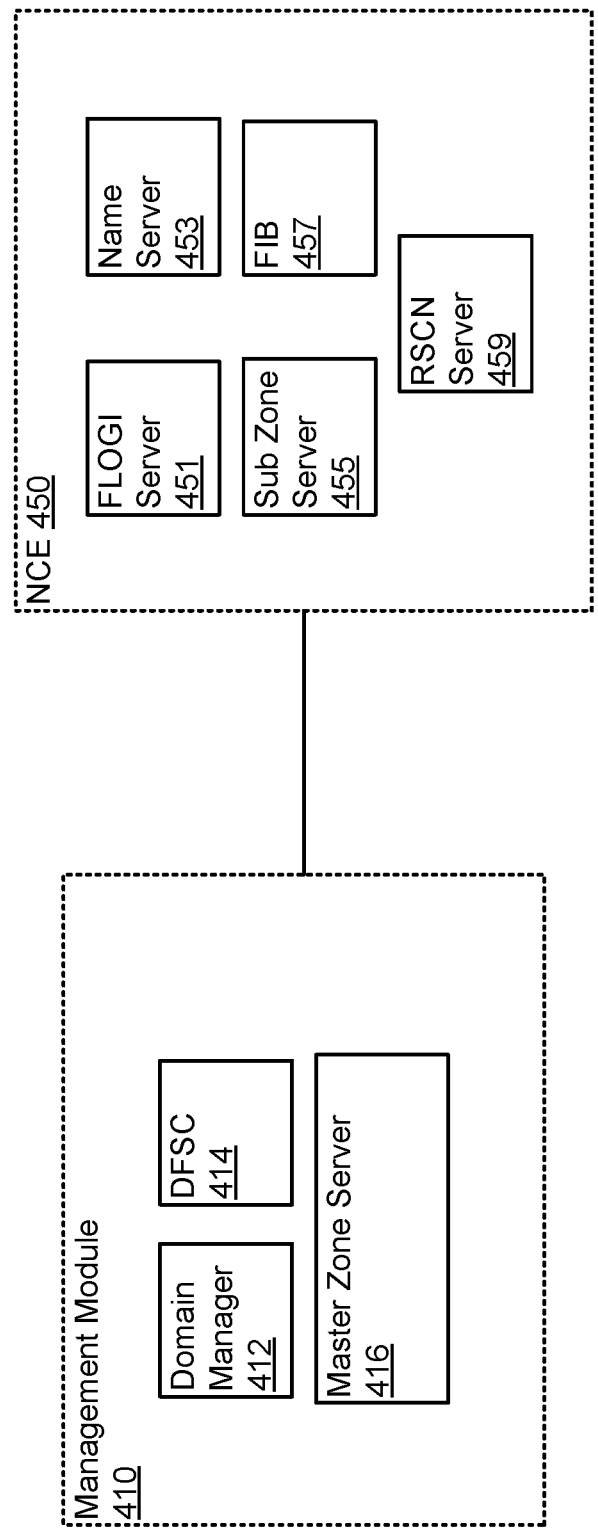
FIG. 4 is a schematic illustration of a management module and a network control entity, according to an embodiment.

FIG. 4 is a schematic illustration of a management module 410 and a network control entity 450, according to an embodiment. The management module 410 and the network control entity 450, respectively, can be structurally and functionally similar to the management modules and the network control entities shown and described with respect to FIG. 1 and FIG. 3. The device hosting the management module 410 (not shown in FIG. 4, e.g., an edge device) and the device hosting the network control entity 450 (not shown in FIG. 4, e.g., an edge device) can be operatively coupled to each other via, for example, a communications network (e.g., the communications network 105 in FIG. 1). Although shown in FIG. 4 as the management module 410 being coupled only to the network control entity 450, in other embodiments, the management module 410 can be coupled to and manage multiple network control entities, similar to the management module 112 in FIG. 1 and the management module 350 in FIG. 3. Similarly stated, the management module 410 can be a portion of a control plane of, for example, a distributed multi-stage switch that includes multiple network control entities (e.g., the network control entity 450).

Similar to the management modules and network control entities shown and described with respect to FIG. 1 and FIG. 3, the management module 410 can manage a set of Fibre Channel E-ports and/or F-ports of one or more devices associated with the management module 410, and the network control entity 450 can mange a set of Fibre Channel F-ports of one or more devices associated with the network control entity 450. Specifically, various Fibre Channel services, protocols, and/or functions can be distributed between the management module 410 and the network control entity 450, such that the Fibre Channel E-ports and/or F-ports associated with the management module 410 and the network control entity 450 can be supported.

As shown in FIG. 4, the management module 410 includes a number of modules including a domain manager 412, a DFSC 414, a master zone server 416, a FSPF module 416 and an E-port state machine 420; the network control entity 450 includes a number of modules including a FLOGI server 451, a name server 453, a sub zone server 455, a forwarding information base (FIB) 457 and a RSCN server 459. While some of the modules shown in FIG. 4 are described as being servers, such servers can be, for example, modules configured to implement a functionality of a server. For example, the FLOGI server 451 can be a module within NCE 450 (e.g., controlled and/or managed by NCE 450) configured to implement the functionality of a physical FLOGI server. For another example, name server 453 can be a module within NCE 450 (e.g., controlled and/or managed by NCE 450) configured to implement the functionality of a physical Fibre Channel name server. Although not shown in FIG. 4 and not elaborated herein, in some embodiments, the management module 410 or the network control entity 450 can include other modules configured to support protocols for or provide services to, for example, Fibre Channel F-ports and/or E-ports managed by the management module 410 or the network control entity 450.

Each of the modules (including modules described as servers) included in the management module 410 and the network control entity 450 can be, for example, a process, application, virtual machine, and/or some other software module (stored in memory and/or executing in hardware) or a hardware module executed at the management module 410 or the network control entity 450. Furthermore, each of the modules can be stored in a memory or a storage associated with the management module 410 or the network control entity 450 (e.g., the memory 250 of the edge device 200 in FIG. 2), and executed by a processor associated with the management module 410 or the network control entity 450 (e.g., the processor 260 of the edge device 200 in FIG. 2). Additionally, in some embodiments, a management module or a network control entity need not include all the modules included in the management module 410 or the network control entity 450 as shown in FIG. 4. For example, a domain manager can be located at a separate device that is operatively coupled to the management module. Thus, the management module need not include a domain manager module.

In some embodiments, the FSPF module 418 can support the FSPF protocol at the Fibre Channel F-ports and E-ports managed by the management module 410. For example, the FSPF module 418 can be configured to establish routes for Fibre Channel data traffic through the management module 410 and/or the network control entity 450 according to the FSPF protocol. In some embodiments, the E-port state machine 420 can be configured to manage the Fibre Channel E-ports associated with the management module 410.

In some embodiments, although not shown in FIG. 4, the network control entity 450 can be configured to manage one or more edge devices having a set of ports (e.g., Fibre Channel F-ports). Each edge device managed by the network control entity 450 can be coupled to a node device (e.g., a host device, a server device, a storage device, etc.) via a port from the set of ports. In some embodiments, an edge device managed by the network control entity 450 can receive a login request from a node device coupled to the edge device via a port (e.g., a Fibre Channel F-port) through which the edge device is coupled to that node device. Such a login request can then be sent from the edge device to the network control entity 450. As a result, the network control entity 450 can be configured to assign a unique identifier from a unique set of identifiers, which is associated with the network control entity 450, to that port of the edge device. Thus, the edge device can send the assigned identifier to the node device.

In some embodiments, the login request can be a FLOGI request, and the unique identifier can be a Fibre Channel Identifier (FCID). In such embodiments, the DFSC 414 of the management module 410 and the FLOGI server 451 of the network control entity 450 can be collectively configured to handle the process of assigning identifiers. Specifically, the DFSC 414 can be configured to assign a unique set of FCIDs, from a common address pool of FCIDs maintained at the management module 410, to the network control entity 450. For example, the FLOGI server 451 can be configured to send a request for a block of FCIDs to the DFSC 414. In response to such a request, the DFSC 414 can be configured to assign and send a unique block of FCIDs to the FLOGI server 451. Thus, in response to receiving a FLOGI request from, for example, a node device newly-connected to a Fibre Channel F-port associated with the network control entity 450, the FLOGI server 451 can be configured to assign a unique FCID from the received unique block of FCIDs to the F-port, and then send the assigned FCID to the node device via that F-port. Additionally, in the fabric login process, operational parameters other than the FCIDs can be exchanged between the FLOGI server 451 and the DFSC 414, such as FC-PH (physical layers of Fibre Channel) version support, classes of service supported, frame size, type of acknowledgement (ACK) supported (e.g., single frame/multiple frame), number of buffer credits, addressing, time out values, error recovery policies, number of sequences, etc.

In some embodiments, although not shown in FIG. 4, the FLOGI service can be distributed across the management module 410 and the associated network control entities, such that the management module 410 and/or each associated network control entity (e.g., the network control entity 450) can run an independent instance of a FLOGI server (e.g., the FLOGI server 451). In such embodiments, each distributed FLOGI server can be managed by the DFSC 414. Each distributed FLOGI server can be configured to allocate FCIDs from the common address pool of FCIDs maintained at the management module 410 to a port (e.g., a Fibre Channel F-port) associated with that FLOGI server, similar to the process described above with respect to the FLOGI server 451. Additionally, multiple techniques can be implemented to synchronize the allocation of FCIDs from the same address pool of FCIDs in such a distributed FLOGI server environment, such as centralized FCID allocation, semi-distributed FCID allocation, distributed FCID allocation, etc.

In some embodiments, such a distributed approach of allocating FCIDs can allow the FLOGI service to scale in a large configuration within a switch fabric system and enable overall better performance when large number of N-ports (i.e., of node devices) perform fabric login simultaneously. In such a way, the DFSC 414 and the distributed FLOGI servers (e.g., the FLOGI server 451) can present the switch fabric system as a single homogenous fibre-switching element to the multiple N-ports of the node devices. Additionally, in some embodiments, other types of login service, such as port login (PLOGI) and process login (PRLI), can be implemented in such a switch fabric system using a distributed mechanism similar to that of the FLOGI service.

In some embodiments, the distributed FLOGI server instances (e.g., the FLOGI server 451) can also be used to provide other parameters and/or capabilities (i.e., other than the FLOGI service) in a consistent manner to each N-port (i.e., of a node device) operatively coupled to the FLOGI server. The parameters and/or capabilities provided by distributed FLOGI server instances can include, for example, a fabric name, value of various timers (R_A_TOV (resource allocation timeout value), E_D_TOV (error detect timeout value), etc.), service capabilities, supported CoS (class of service) and their attributes, or the like. In such embodiments, similar to the FLOGI service, the DFSC 414 can be configured to allocate those parameters and/or capabilities to the distributed FLOGI server instances.

In some embodiments, the domain manager 412 of the management module 410 can be configured to associate one or more Fibre Channel Domains with the network control entities managed by the management module 410. The domain manager 412 can be used to assign one or more Fibre Channel Domains to the common address pool of FCIDs maintained at the management module 410, such that the FCIDs from that common address pool can be distributed across various FLOGI server instances (e.g., the FLOGI server 451) in response to the FLOGI requests received at the FLOGI server instances, and the FCIDs allocated to a given FLOGI server instance are within a given Fibre Channel Domain. In some embodiments, a FCID can include a domain field that contains information of the Fibre Channel Domain associated with that FCID. For example, a FCID of 3 bytes can have 1 byte allocated to a domain field containing information of a Fibre Channel Domain, and the other 2 bytes allocated to an address within that given Fibre Channel Domain (i.e., $2^{16}$ (i.e., 65,536) unique addresses within each Fibre Channel Domain).

In some embodiments, if a single Fibre Channel Domain has enough FCIDs to handle the received FLOGI requests (i.e., a unique FCID can be allocated in response to each unique FLOGI request), the domain manager 412 can associate the single Fibre Channel Domain with the common address pool of FCIDs maintained at the management module 410. In such embodiments, the network control entity 450 is associated with that Fibre Channel Domain that is the same Fibre Channel Domain associated with any remaining network control entity managed by the management module 410. For example, the network control entities 380-382 in FIG. 3 can be associated with a common Fibre Channel Domain. In some other embodiments, for example, when a single Fibre Channel Domain does not have enough FCIDs to handle the received FLOGI requests, the domain manager 412 can associate multiple Fibre Channel Domains to the common address pool of FCIDs maintained at the management module 410. In such embodiments, the network control entity 450 is associated with a Fibre Channel Domain that can be different from the Fibre Channel Domain associated with another network control entity managed by the management module 410. In the example of FIG. 3, the network control entity 380 can be associated with a Fibre Channel Domain and the network control entities 381-382 can be associated with a different Fibre Channel Domain.

In some embodiments, the domain manager 412 can interact with the DFSC 414 to manage the Fibre Channel Domains assigned to the address pool of FCIDs maintained at the management module 410. In some embodiments, the DFSC 414 can be the single-point module within the management module 410 that interacts with the domain manager 412. In some embodiments, the domain manager 412 can be dynamically or manually configured. Similarly stated, the domain manager 412 can be set-up, configured and/or operated by, for example, a program, an application, a network administrator, an operator, etc.

In some embodiments, similar to the combination of FLOGI request and FCID described above, the login request received at the network control entity 450 can be a FLOGI or a fabric discovery (FDISC) request embedded and/or included in a FIP packet, and the unique identifier assigned to the port associated with the network control entity 450 can be a FCoE MAC address. As an encapsulation mechanism of Fibre Channel frames over Ethernet networks, FCoE can allow Fibre Channel to use Ethernet networks (e.g., 10 Gigabit Ethernet networks or higher speeds) while preserving the Fibre Channel protocols, functions and/or services. As an integral part of FCoE, the FIP can enable discovering and initializing FCoE capable entities connected to an Ethernet network. In a switch fabric system described herein, the implementation of the FIP protocol can be distributed across all network control entities and management module(s) in the switch fabric system. In some embodiments, the FIP protocol can interact with a local FLOGI server instance (e.g., the FLOGI server 451) and/or a DFSC instance (e.g., the DFSC 414) running on a network control entity or management module.

In some embodiments, the DFSC 414 of the management module 410 and the FLOGI server 451 of the network control entity 450 can be collectively configured to handle the process of assigning identifiers. In some embodiments, such a process can be handled in a similar method as that for the combination of FLOGI request and FCID described above. For example, the DFSC 414 and the FLOGI server 451 can be collectively configured to assign a unique FCoE MAC address from, for example, a common pool of FCoE MAC addresses maintained at the management module 410, to a port (e.g., a Fibre Channel F-port) of an edge device managed by the network control entity 450 in response to a FLOGI or FDISC request embedded and/or included in a FIP packet being received at that port. In some other embodiments, a FCoE MAC address can be generated by other means and then assigned as a unique identifier to each port where a FLOGI or FDISC request is received. For example, after a FLOGI or FDISC request within a FIP packet is received at a port managed by the network control entity 450, the DFSC 414 and the FLOGI server 451 can be collectively configured to generate a unique FCoE MAC address according to a predefined algorithm based on a FCID assigned to that port, and then assign the FCoE MAC address as a unique identifier to the port. In some embodiments, such a method can be referred to as a fabric-provided MAC address (FPMA) mode.

In some embodiments, a name server can be implemented in a distributed manner across the network control entities (e.g., the network control entity 450) and management module(s) (e.g., the management module 410) of a switch fabric system. As a result, the implementation of the name server can be scaled within the switch fabric system to handle the corresponding operations upon login (e.g., attribute registrations, deregistrations, queries, etc.) from N-ports associated with the switch fabric system. For example, the network control entity 450 can include a name server 453, as shown in FIG. 4. Upon a node device being connected to an edge device managed by the network control entity 450 (e.g., via a N-port), the FLOGI server 451 can be configured to handle the login process, and then registration, deregistration and/or other operations can be done with the name server 453 for that device.

In some embodiments, the name server 453 can include a Fibre Channel Name Server Database, which can store information associated with the ports (e.g., Fibre Channel F-ports) managed by the network control entity 450, as well as information associated with the devices coupled to those ports, such as addresses (e.g., MAC address, IP address) and register attributes (server capabilities, type of device, etc.) of the devices, and/or the like. In some embodiments, the management module 410 can be configured to maintain a Fibre Channel Name Server Database and distribute an instance of the Fibre Channel Name Server Database to each network control entity managed by the management module 410. For example, the management module 410 can be configured to send an instance of the Fibre Channel Name Server Database to the network control entity 450, such that the instance of the Fibre Channel Name Server Database can be stored in the name server 453 of the network control entity 450.

Furthermore, in some embodiments, the distributed implementation of name servers at each network control entity and/or management module can be used to collectively discover devices coupled to and login at other network control entities or management modules. Specifically, after a device (e.g., an edge device) performs login and registers attributes with a network control entity or management module, the name server on that network control entity or management module can be configured to push the received login and attributes data to all or a portion of other network control entities and/or management modules within the switch fabric system. Similarly stated, data associated with the devices local to the name server (e.g., data defined in response to FLOGI requests from the devices being processed at the network control entity or management module hosting that name server) can be distributed to all the relevant network control entities and/or management modules within the switch fabric system. In addition, a management module can be configured to push data that it learns from another switch fabric system coupled to that management module to all or a portion of the network control entities managed by that management module. Thus, information associated with ports or devices (addresses, register attributes, status, capabilities, etc.) managed by a network control entity or management module can be distributed across the network control entities and/or management modules within a switch fabric system and/or across switch fabric systems. In some embodiments, such a mechanism can enable device discovery and zone filter compilation to be performed at network control entities and management modules locally.

In some embodiments, a zoning mechanism can be implemented in a switch fabric system. The zoning mechanism can enable selective discovery of devices, as well as disable unwanted traffic between certain fabric nodes and devices (e.g., an edge device, a node device). In such embodiments, zone database management can be centralized at a management module, while zone enforcement can be distributed across multiple network control entities managed by that management module. Similarly stated, a zone set database can be centrally located and stored at a management module, which can be configured to distribute all the information necessary to enforce zoning (e.g., hard zoning, soft zoning) to the associated network control entities. Specifically, the management module can be configured to send an instance of an active zone set stored within the zone set database to each network control entity managed by the management module, such that each network control entity can enforce the active zone set. Thus, such a zoning mechanism is unlike the FLOGI, name server and RSCN server mechanisms described herein, where the FLOGI servers (the FLOGI server 451), name servers (e.g., the name server 453) and RSCN server (e.g., the RSCN server 459) can be distributed across all network control entities and/or management modules within the switch fabric system. Additionally, in some embodiments, a management module can be configured to send an instance of the active zone set to each network control entity after distributing an instance of a Fibre Channel Name Server Database to each network control entity.

Furthermore, using a single instance of zone set database running on a management module for the entire switch fabric system can simplify the design and provide a single unified interface for updating the zone set database. In some embodiments, a zone set database stored and maintained at a management module can be updated by, for example, a managing application (stored in memory and/or executing in hardware) using Fibre Channel Common Transport (FCCT) through a Fibre Channel F-port from a node device (e.g., a server device, a storage device, etc.); an adjacent switch fabric by merger-zone processing through a Fibre Channel E-port; a remote switch fabric via fabric management session protocol over a SW-ILS field; an administrator via a command-line interface (CLI), etc. Additionally, for the zoning service to scale within the switch fabric system, interaction of the zone set database with the abovementioned entities used to update the zone set database should be minimal. Thus, zone enforcement processing and any event dispatch processing as a result of a change in the zone set database need not be centralized but can be distributed across all the associated network control entities.

In the example of FIG. 4, the master zone server 416 at the management module 410 can include a zone set database, and the sub zone server 455 at the network control entity 450 can be configured to locally implement zone enforcement. In some embodiments, information associated with multiple active and/or inactive zone sets can be stored and maintained in the zone set database included in the master zone server 416. In some embodiments, the sub zone server 455 can receive an instance of an active zone set from the master zone server 416. The sub zone server 455 can then be configured to enforce the active zone set with respect to one or multiple ports managed by the network control entity 450. In some embodiments, the sub zone server 455 can be configured to receive an indication (e.g., to add, to delete) of an active zone set from the master zone server 416. As a result, the sub zone server 455 can then be configured to locally update information of the zone set accordingly. In some embodiments, a zone set described above can be a Fibre Channel zone set.

In some embodiments, a service of state change notification can be implemented in a switch fabric system, such that whenever a registered state of a device is changed (e.g., the device goes offline or online), other devices in a common zone can be notified. In some embodiments, a notification of such a state change can be carried by a RSCN or SCR request. In such embodiments, instances of RSCN server, which are responsible for processing incoming RSCN/SCR requests (RSCN or SCR requests can be generated at end-devices such as a peripheral processing device), can be distributed across network control entities and/or management modules within the switch fabric system. In some embodiments, such an instance of RSCN server can be a Fibre Channel RSCN module. Furthermore, the instance of RSCN server can be configured to, among other functionalities, send notifications of fabric changes to other network control entities and/or management modules. In some embodiments, such notifications do not cross zones.

In some embodiments, a management module can receive a request (e.g., a SCR request, a RSCN request) associated with a state change from a network control entity managed by that management module. In response to receiving such a request, the management module can be configured to send an update (e.g., a SCR update) to the remaining network control entities managed by the management module based on the received request, such that each remaining network control entity can update a RSCN server at that network control entity accordingly.

In the example of FIG. 4, the network control entity 450 includes a RSCN server 459. In some embodiments, the RSCN server 459 can maintain two lists of local registered N-ports. A local N-port can be a N-port of, for example, a node device operatively coupled to and managed by the network control entity 450. One list can contain all the local N-ports that have registered to receive N-port detected events; the other list can contain all the local N-ports that have registered to receive fabric-detected events. If a N-port registers to receive N-port detected events, then that N-port can receive a notification whenever an event of a predefined type is detected at one of a given set of N-ports. Similarly, if a N-port registers to receive fabric-detected events, then that N-port can receive a notification whenever an event of a predefined type is detected within a certain portion of the switch fabric system (e.g., in a communications network, at an edge device). In some embodiments, a local N-port can be in both lists maintained at the RSCN server 459 if that local N-port has registered to receive both types of events. In some embodiments, pair of such lists can be maintained per zone. That is, the RSCN server 459 can maintain one pair of the two lists for each active zone associated with the local N-ports.

In some embodiments, the RSCN server 459 can be configured to receive a SCR request from a port associated with the network control entity 450, such as a local N-port. In some embodiments, such a SCR request can be a SCR extended link service (ELS) request. To process such an incoming SCR request, the RSCN server 459 can be configured to derive the zone membership for the N-port, for example, by querying the sub zone server 455. Based on the derived zone membership for the N-port, the RSCN server 459 can then be configured to update the corresponding list(s) maintained at the RSCN server 459 according to the received SCR request. For example, the RSCN server 459 can be configured to add the N-port to, remove the N-port from, or modify the corresponding N-port detected list and/or the corresponding fabric-detected list associated with the zone accordingly.

In some embodiments, upon receiving a SCR request from a port managed by the network control entity 450, the RSCN server 459 can be configured to send the SCR request (or alternatively, a new SCR request based on the received SCR request) to the management module 410. The management module 410 can then be configured to send a SCR update to the remaining network control entities (not shown in FIG. 4) based on the received SCR request. In response to receiving such a SCR update, each remaining network control entity can update a RSCN database at that network control entity in a similar way to the network control entity 450 updating the RSCN server 459, as described above.

In some embodiments, the FIB 457 at the network control entity 450 can be used to store information associated with forwarding traffic at the ports (e.g., F-ports, N-ports) managed by the network control entity 450. Particularly, the FIB 457 can store information associated with routes having one or more ports managed by the network control entity 450. Such a route can be a local domain route (e.g., a FLOGI route) or a remote domain route (e.g., a FSPF route). In some embodiments, the FLOGI server 451 can be configured to install routes for directly attached N-ports into the FIB 457. In some embodiments, routes installed in other FIBs at other (e.g., remote) network control entities and/or management modules can be exported to the FIB 457 via, for example, inter-fabric transport mechanism. In such embodiments, typically routes having one or more ports managed by the network control entity 450 can be exported to the FIB 457.

Figure 5:
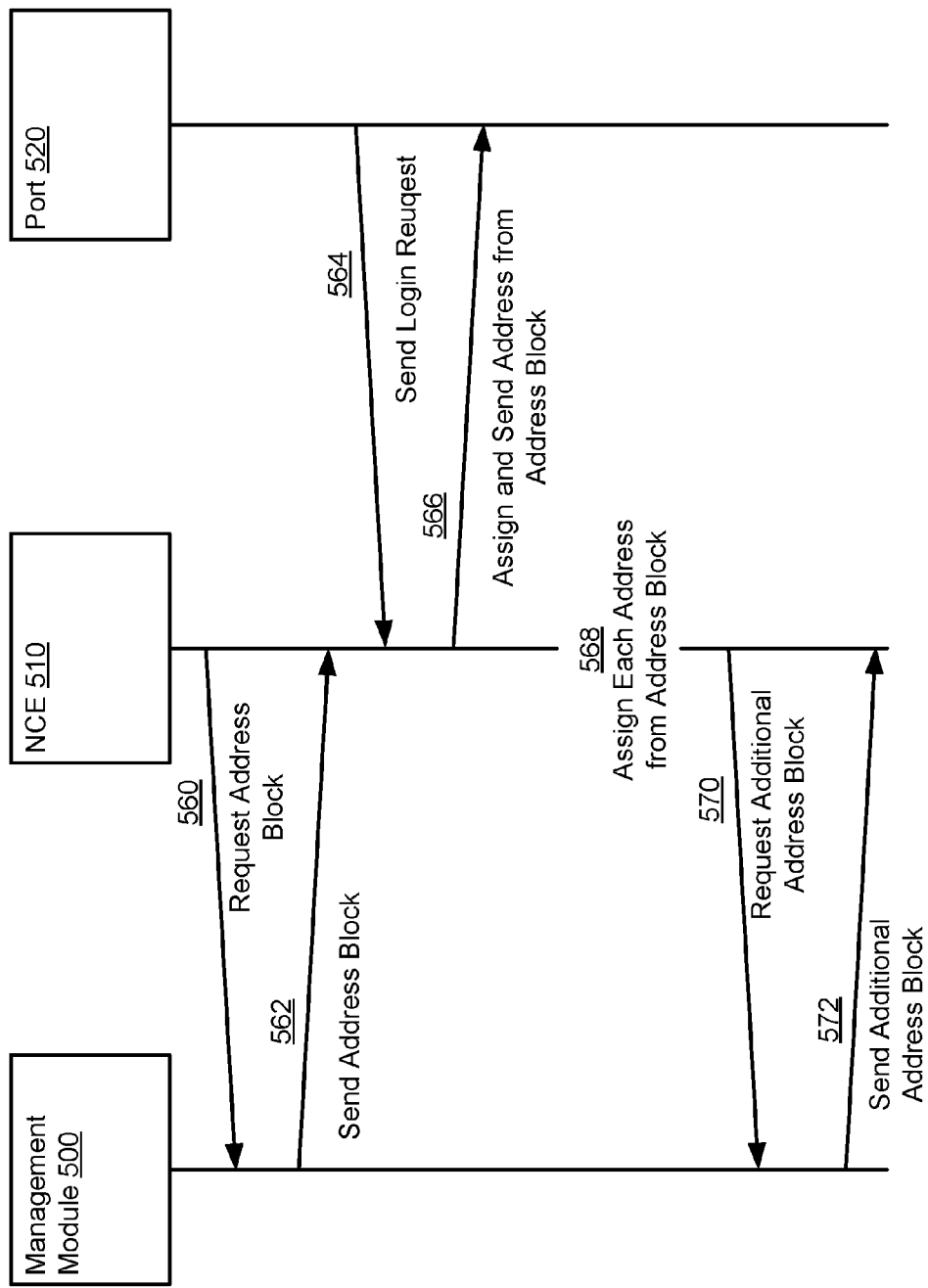
FIG. 5 is a representation of a series of operations for assigning and distributing addresses in a control plane of a switch fabric system, according to an embodiment.

FIG. 5 is a representation of a series of operations for assigning and distributing addresses in a control plane of a switch fabric system, according to an embodiment. Specifically, FIG. 5 shows a representation, based on a timeline, of the series of operations between a management module 500, a network control entity 510 and a port 520. The management module 500 and the network control entity 510 can be structurally and functionally similar to the management modules and network control entities, respectively, shown and described with respect to FIGS. 1, 3 and 4. Particularly, the management module 500 is operatively coupled to and manage the operations of the network control entity 510. The port 520 can be a port (e.g., a Fibre Channel F-port) that is managed by the network control entity 510 and potentially coupled to a node device. For example, the port 520 can be structurally and functionally similar to the port 211, 212, 221, 222 shown and described with respect to FIG. 2.

As shown in FIG. 5, at the beginning, the network control entity 510 is configured to send a request for a block of addresses to the management module 500 via a control signal, shown as the signal 560. As described with respect to FIG. 4, the addresses requested by the network control entity 510 can be identifiers that can be assigned to potential node devices associated with the network control entity 510. That is, upon login of a node device with the network control entity 510, the network control entity 510 can assign a unique identifier to that node device. Such identifiers can be, for example, FCIDs, FCoE MAC addresses, etc. In the case of FCIDs, a FLOGI server (e.g., the FLOGI server 451 in FIG. 4) of the network control entity 510 can be configured to send the request for FCIDs to the management module 500.

In response to receiving the request for addresses (i.e., the signal 560) from the network control entity 510, the management module 500 can be configured to send a block of addresses to the network control entity 510 via a control signal, shown as the signal 562. In some embodiments, the block of addresses can be retrieved from a common address pool maintained at the management module 500. In some embodiments, the block of addresses sent to the network control entity 510 is unique, in the sense that it is different from the addresses sent to any other network control entity from the management module 500. For example, in response to receiving a request for FCIDs from the FLOGI server of the network control entity 510, a DFSC module (e.g., the DFSC 414 in FIG. 4) of the management module 500 can be configured to retrieve a unique block of FCIDs from a common address pool of FCIDs maintained at the management module 500, and then send the retrieved block of FCIDs to the network control entity 510 via the signal 562.

As shown in FIG. 5, the port 520 can be configured to send a login request to the network control entity 510 via a control signal, shown as the signal 564 in FIG. 5. In some embodiments, the port 520 can receive a login request from a node device coupled to the port 520 as a result of the node device being newly connected to the port 520 or newly activated. The port 520 can then be configured to forward the received login request to the network control entity 510. Alternatively, the port 520 can be configured to generate a login request based on the received login request from the node device, and then send the generated login request to the network control entity 510. In some embodiments, the login request can be a FLOGI request or a FDISC request (e.g., optionally embedded and/or included in a FIP packet).

In response to receiving the login request via the signal 564, the network control entity 510 can be configured to assign an address from the block of addresses to the port 520, and then send the assigned address to the port 520 via a control signal, shown as the signal 566 in FIG. 5. In some embodiments, the address is uniquely assigned to the port 520, in the sense that the address assigned to the port 520 is different from an address assigned to any other port. For example, if a FLOGI request is received at the network control entity 510, the FLOGI server of the network control entity 510 can be configured to assign a unique FCID to the port 520 and then send the assigned FCID to the port 520 via the signal 566. For another example, if a FLOGI or FDISC request embedded and/or included in a FIP packet is received at the network control entity 510, the FLOGI server of the network control entity 510 can be configured to assign a unique FCoE MAC address to the port 520 and then send the assigned FCoE MAC address to the port 520 via the signal 566.

Similar to the interaction between the network control entity 510 and the port 520 described above, the network control entity 510 can be configured to assign and send another address from the received block of addresses to another port (not shown in FIG. 5) managed by the network control entity 510 in response to that port sending a login request to the network control entity 510. In some embodiments, the network control entity 510 can be configured to assign and send each address from the received block of addresses to a port managed by the network control entity 510, indicated by the step 568 in FIG. 5.

In some embodiments, after assigning and sending out each address from the received block of addresses, the network control entity 510 can be configured to send a request for an additional block of addresses to the management module 500 via a control signal, shown as the signal 570. Alternatively, the request for additional addresses can be sent by the network control entity 510 in response to the number of remaining addresses possessed at the network control entity 510 reaching a predefined threshold, which is not necessarily zero but can be a positive number. In some embodiments, such an action of requesting additional addresses can be triggered at the network control entity 510, for example, automatically by the number of available (i.e., unassigned) addresses possessed at the network control entity 510 being lower than a predefined threshold (e.g., defined by a network administrator), by a command from an operator, or by any other suitable means. For example, after the network control entity 510 sends an address (e.g., a FCID, a FCoE MAC address) to the port 520 via the signal 566, the network control entity 510 checks the number of available addresses and determines that number is lower than a predefined threshold (e.g., 1, 2, 5, 10, etc.). As a result, the network control entity 510 is configured to send a request for an additional block of addresses to the management module 500 via the signal 570.

In response to receiving the request for additional addresses (i.e., the signal 570) from the network control entity 510, the management module 500 can be configured to send an additional block of addresses to the network control entity 510 via a control signal, shown as the signal 572. Similar to the addresses previously sent to the network control entity 510, the additional block of addresses can be retrieved from the common address pool maintained at the management module 500. Furthermore, the additional block of addresses sent to the network control entity 510 is unique, in the sense that it is different from addresses sent to any other network control entity from the management module 500, as well as the addresses previously sent to the network control entity 510. For example, in response to receiving a request for additional FCIDs from the FLOGI server of the network control entity 510, the DFSC module of the management module 500 can be configured to retrieve an additional unique block of FCIDs from the common address pool of FCIDs maintained at the management module 500, and then send the retrieved additional block of FCIDs to the network control entity 510 via the signal 572.

Figure 6:
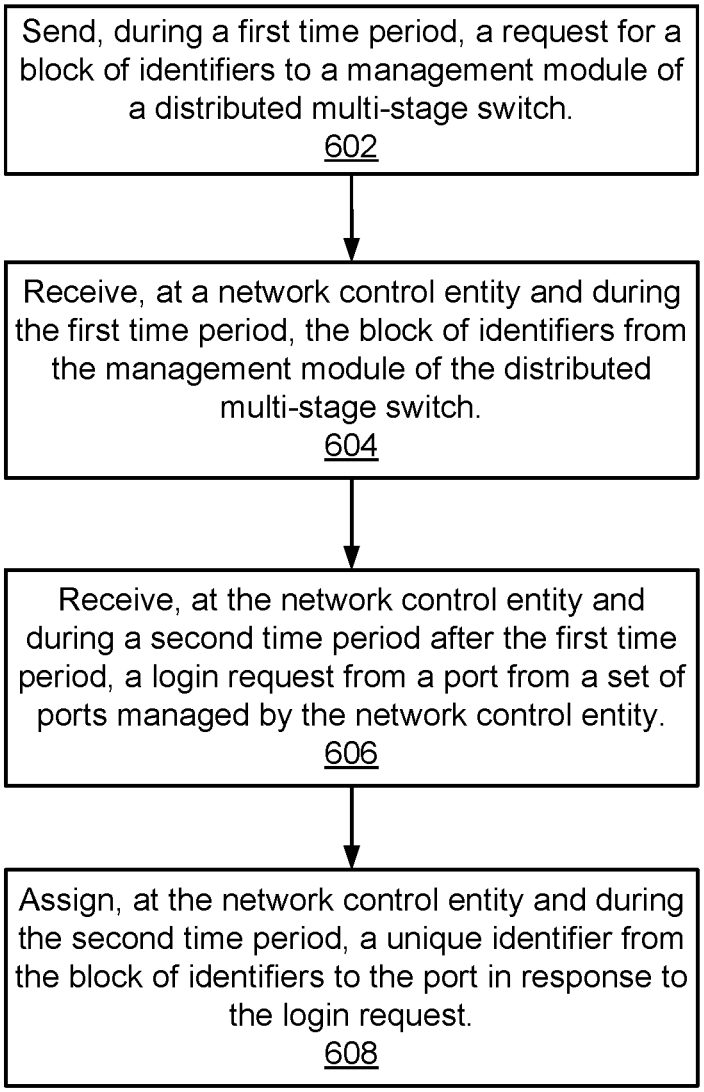
FIG. 6 is a flowchart illustrating a method for distributing identifiers for login requests in a switch fabric system, according to an embodiment.

FIG. 6 is a flowchart illustrating a method for distributing identifiers for login requests in a switch fabric system, according to an embodiment. In some embodiments, a memory (e.g., the memory 250 in FIG. 2) within, for example, an edge device (e.g., the edge device 200 in FIG. 2) hosting a network control entity (e.g., the network control entity 253 in FIG. 2) includes a non-transitory processor-readable medium that stores code representing instructions to be executed by a processor (e.g., the processor 260 in FIG. 2) of the edge device. Some of the instructions can be executed to cause the processor to execute a series of operations with respect to retrieving and distributing identifiers for login requests.

At 602, a request for a block of identifiers can be sent from the network control entity to a management module of a distributed multi-stage switch during a first time period. In some embodiments, an identifier can be, for example, an address that can be uniquely assigned to a node device upon login of the node device. For example, the identifiers can be FCIDs, FCoE MAC addresses, etc. In the case of FCIDs, a FLOGI server of the network control entity can be configured to send the request for a block of identifiers to the management module. In the example of FIG. 4, the FLOGI server 451 of the network control entity 450 can be configured to send a request for a block of FCIDs to the DFSC 414 of the management module 410 during a first time period. The network control entity 450 and the management module 410 are both associated with a distributed multi-stage switch (not shown in FIG. 4).

At 604, the block of identifiers can be received at the network control entity from the management module of the distributed multi-stage switch during the first time period. Specifically, in response to receiving the request for a block of identifiers, the management module can be configured to retrieve a block of identifiers from, for example, a common pool of identifiers maintained at the management module. The retrieved identifiers can then be sent to the network control entity from the management module during the first time period. In some embodiments, the block of identifiers sent to the network control entity is unique in the sense that it is different from the identifiers sent to any other network control entity from the management module. In the example of FIG. 4, in response to receiving the request for a block of identifiers from the FLOGI server 451, the DFSC 414 can be configured to retrieve a unique block of identifiers from a common pool of identifiers (not shown in FIG. 4) maintained at the management module 410, and then send the retrieved identifiers to the FLOGI server 451, during the first time period.

At 606, a login request from a port from a set of ports managed by the network control entity can be received at the network control entity during a second time period after the first time period. In some embodiments, such a login request can be sent, during the second time period, from the port (e.g., a Fibre Channel F-port) upon a login of a node device at that port after the first time period. The node device can be, for example, newly connected to the port, or newly activated. Such a login request can be a FLOGI request, a FDISC request, or any other type of login request. In the example of FIG. 4, upon a login of a node device (not shown in FIG. 4) at a port managed by the network control entity 450, the FLOGI server 451 can receive from the port a login request that is originated from the node device, during a second time period after the first time period.

At 608, a unique identifier from the block of identifiers can be assigned at the network control entity to the port during the second time period, in response to the login request. The identifier assigned to the port is unique in the sense that it is different from an identifier assigned to any other port. In some embodiments, the identifier assigned to the port can be further sent from the network control entity to the port. In some embodiments, if the login request received at the network control entity is a FLOGI request, the unique identifier assigned at the network control entity to the port can be a FCID. In some other embodiments, if the login request received at the network control entity is a FLOGI or FDISC request (e.g., optionally embedded in a FIP packet), the unique identifier assigned at the network control entity to the port can be a FCoE MAC address. In the example of FIG. 4, in response to the login request received at the FLOGI server 451 from the port during the second time period, the FLOGI server 451 can be configured to assign a unique identifier (e.g., a FCID, a FCoE MAC address, etc.) from the block of identifiers received from the DFSC 414 to the port, during the second time period.

Embodiments shown and described above refer to multiple peripheral processing devices, including compute nodes, storage nodes, service nodes and routers. In some embodiments, one or more of the compute nodes can be general-purpose computational engines that can include, for example, processors, memory, and/or one or more network interface devices (e.g., a network interface card (NIC)). In some embodiments, the processors within a compute node can be part of one or more cache coherent domains. In some embodiments, the compute nodes can be host devices, servers, and/or so forth. In some embodiments, one or more of the compute nodes can have virtualized resources such that any compute node (or a portion thereof) can be substituted for any other compute node (or a portion thereof) operatively coupled to a switch fabric system.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components, and/or features of the different embodiments described.

What is claimed is:

1. A system, comprising:
a first edge device instantiating a plurality of network control entities associated with a distributed multi-stage switch,
each network control entity from the plurality of network control entities including an instance of a Fabric Login (FLOGI) server, that instance of the FLOGI server being implemented by a processor associated with that network control entity, that instance of the FLOGI server configured to request a unique set of identifiers from a management Distributed FLOGI Server Coordinator (DFSC) instantiated on a second edge device of the distributed multi-stage switch and implemented by a processor associated with the second edge device, that instance of the FLOGI server configured to assign a unique identifier from the unique set of identifiers to a port from the plurality of ports of at least one edge device managed by the network control entity associated with that instance of the FLOGI server, in response to receiving, at that instance of the FLOGI server, a login request associated with the port, that instance of the FLOGI server configured to send the unique identifier to the port,
each network control entity from the plurality of network control entities includes an instance of a Fibre Channel Registered State Change Notification (RSCN) server, that instance of the RSCN server configured to obtain, from a sub zone server of that network control entity, zone membership information of a node port of the at least one edge device, that instance of the RSCN server configured to modify a list of detected ports stored at that instance of the RSCN server based on the zone membership information of the node port.

2. The system of claim 1, wherein each network control entity from the plurality of network control entities includes a Fibre Channel Name Server Database storing information associated with the plurality of ports managed by that network control entity.

3. The system of claim 1, wherein the unique identifier is a Fibre Channel Identifier (FCID) and the login request is a FLOGI request.

4. The system of claim 1, wherein the unique identifier is a Fibre Channel over Ethernet (FCoE) Media Access Control (MAC) address and the login request is included in a FCoE Initialization Protocol (FIP) packet.

5. The system of claim 1, wherein:
the DFSC instantiated on the second edge device is configured to assign the unique set of identifiers to each network control entity from the plurality of network control entities, each network control entity from the plurality of network control entities is configured to manage a third edge device of the distributed multi-stage switch having a plurality of Fibre Channel E-ports.

6. The system of claim 1, wherein each network control entity from the plurality of network control entities includes a Forwarding Information Base (FIB) configured to store information associated with forwarding traffic at N-Ports associated with the at least one edge device, the FIB for that network control entity configured to store information associated with routes including at least one of the N-Ports associated with the at least one edge device.

7. The system of claim 1, wherein a first network control entity from the plurality of network control entities is associated with a Fibre Channel Domain corresponding to a Fibre Channel Domain associated with a second network control entity from the plurality of network control entities.

8. The system of claim 1, wherein a first network control entity from the plurality of network control entities is configured to receive a state change registration (SCR) update from the processor associated with the second edge switch, the SCR update indicating a state change of an edge device associated with a second network control entity from the plurality of network control entities, the first network control entity is further configured to update a list of ports maintained by the RSCN server associated with the first network control entity based on the SCR update.

9. The system of claim 1, wherein a network control entity from the plurality of network control entities sends a signal indicating a state change at the network control entity, the state change indicating whether or not the first edge device is online or offline.

10. A non-transitory processor-readable medium storing code representing instructions to be executed by a processor, the code comprising code to cause the processor to:
send, from a Fabric Login (FLOGI) server of a network control entity and implemented by a processor associated with the network control entity and during a first time period, a request for a block of identifiers to a management Distributed FLOGI Server Coordinator (DFSC) of a distributed multi-stage switch and implemented by a processor associated with the distributed multi-stage switch;
receive, at the FLOGI server and during the first time period, the block of identifiers from the DFSC;
receive, at the network control entity and during a second time period after the first time period, a login request from a port from a plurality of ports managed by the network control entity;
assign, at the FLOGI server and during the second time period, a unique identifier from the block of identifiers to the port in response to the login request;
forward, from the network control entity, data from the login request from the port to at least one other network control entity from a plurality of other network control entities;
obtain, from a sub zone server of the network control entity, zone membership information of a node port of the plurality of ports, and
modify, at an instance of a Fibre Channel Registered State Change Notification (RSCN) server at the network control entity, a list of detected ports stored at the RSCN server based on the zone membership information of the node port.

11. The non-transitory processor-readable medium of claim 10, wherein the network control entity sends a signal indicating a state change at the network control entity, the state change indicating whether or not an edge device associated with the network control entity is online or offline.

12. The non-transitory processor-readable medium of claim 10, wherein the network control entity is a first network control entity, the first network control entity is configured to receive a state change registration (SCR) update from a management processor, the SCR update indicating a state change of an edge device associated with a second network control entity from a plurality of network control entities including the first network control entity, the first network control entity is further configured to update a list of ports maintained by the RSCN server based on the SCR update.

13. The non-transitory processor-readable medium of claim 10, wherein the unique identifier is a Fibre Channel Identifier (FCID) and the login request is a FLOGI request.

14. The non-transitory processor-readable medium of claim 10, wherein the unique identifier is a Fibre Channel over Ethernet (FCoE) Media Access Control (MAC) address and the login request is included in a FCoE Initialization Protocol (FIP) packet.

15. The non-transitory processor-readable medium of claim 10, wherein each network control entity from a plurality of network control entities including the network control entity, includes a Forwarding Information Base (FIB) configured to store information associated with forwarding traffic at N-Ports associated with at least one edge device associated with the network control entity, the FIB configured to store information associated with routes including at least one of the N-Ports associated with the at least one edge device.

16. An apparatus, comprising:
a memory; and
a processor operatively coupled to the memory and associated with a first edge device, the processor configured to implement:
a Fabric Login (FLOGI) server associated with a network control entity and configured to request, from a management Distributed FLOGI Server Coordinator (DFSC) instantiated on a second edge device and implemented on a processor of the second edge device, a set of identifiers associated with the network control entity, the FLOGI server configured to receive the set of identifiers from the DFSC, the FLOGI server configured to assign an identifier from the set of identifiers to a port from a plurality of ports of the first edge device in response to receiving a login request associated with the port, and
a Fibre Channel Registered State Change Notification (RSCN) server configured to obtain zone membership information of a node port of the first edge device, the RSCN server configured to modify a list of detected ports stored at the RSCN server based on the same membership information.

17. The apparatus of claim 16, wherein the processor is further configured to implement a sub zone server configured to locally store information associated with an active zone set in response to receiving an indication that the active zone set has been modified in a master zone server of a management processor.

18. The apparatus of claim 16, wherein the processor is further configured to implement a name server configured to perform login functions, including at least one of (1) attribute registration, (2) deregistration, or (3) queries, for N-Ports associated with the first edge device, the name server including a Fibre Channel (FC) name server database storing port information, including at least one of (a) a port address of the first edge device, or (b) a register attribute of the first edge device.

19. The apparatus of claim 16, wherein the identifier is a Fibre Channel Identifier (FCID) and the login request is a FLOGI request.

20. The apparatus of claim 16, wherein the identifier is a Fibre Channel over Ethernet (FCoE) Media Access Control (MAC) address and the login request is included in a FCoE Initialization Protocol (FIP) packet.

* * * * *